(12) United States Patent
Park et al.

(10) Patent No.: US 9,923,830 B2
(45) Date of Patent: Mar. 20, 2018

(54) METHOD AND APPARATUS FOR CONTROLLING MEDIA DELIVERY IN MULTIMEDIA TRANSPORT NETWORK

(71) Applicant: Samsung Electronics Co., Ltd., Suwon-si, Gyeonggi-do (KR)

(72) Inventors: Kyung-Mo Park, Seoul (KR); Sung-Ryeul Rhyu, Yongin-si (KR); Sung-Oh Hwang, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/256,592

(22) Filed: Apr. 18, 2014

(65) Prior Publication Data
US 2014/0314080 A1    Oct. 23, 2014

(30) Foreign Application Priority Data
Apr. 18, 2013 (KR) .................. 10-2013-0043230

(51) Int. Cl.
*H04L 12/815* (2013.01)
*H04L 29/06* (2006.01)
(Continued)

(52) U.S. Cl.
CPC .......... *H04L 47/23* (2013.01); *H04L 65/4084* (2013.01); *H04L 65/4092* (2013.01); *H04L 65/607* (2013.01); *H04L 65/80* (2013.01); *H04N 21/23439* (2013.01); *H04N 21/23805* (2013.01); *H04N 21/44209* (2013.01); *H04N 21/6373* (2013.01)

(58) Field of Classification Search
CPC ..................................................... H04L 47/23
See application file for complete search history.

(56) References Cited

U.S. PATENT DOCUMENTS

2008/0225842 A1* 9/2008 Goldfein ................. H04L 47/25
370/389
2009/0083431 A1* 3/2009 Balachandran ......... G06F 15/16
709/228
(Continued)

FOREIGN PATENT DOCUMENTS

CN 101785274 A 7/2010
CN 102811166 A 12/2012

OTHER PUBLICATIONS

Kyungmo Park et al., Text of ISO/IEC 2nd CD 23008-1 MPEG Media Transport, 103. MPEG Meeting, Geneva, Switzerland, Motion Picture Expert Group or ISO/IEC JTC1/SC29/WG11, No. N13293, Feb. 12, 2013, XP030020043.
(Continued)

*Primary Examiner* — Brian D Nguyen
*Assistant Examiner* — Abdullahi Ahmed
(74) *Attorney, Agent, or Firm* — Jefferson IP Law, LLP

(57) ABSTRACT

A method and an apparatus for controlling media delivery in a multimedia transport network. The method includes transmitting composition information (CI) on media assets within a media package to be transmitted, to a user equipment (UE), packetizing the media assets of the media package to packets, transmitting some of the packets to the UE, receiving a feedback message including information on an available bitrate determined by the UE from the UE while the some of the packets are transmitted, selecting media data, which can be transmitted according to the available bitrate, from the media package by using asset delivery characteristics (ADCs) of the media assets within the media package, and packetizing the selected media data to packets and transmitting the packets to the UE.

13 Claims, 21 Drawing Sheets

(51) Int. Cl.
*H04N 21/238* (2011.01)
*H04N 21/442* (2011.01)
*H04N 21/6373* (2011.01)
*H04N 21/2343* (2011.01)

(56) References Cited

U.S. PATENT DOCUMENTS

| | | |
|---|---|---|
| 2012/0307636 A1 | 12/2012 | Song et al. |
| 2012/0324521 A1* | 12/2012 | Rhyu ................ H04N 21/84 725/109 |
| 2013/0077501 A1 | 3/2013 | Krishnaswamy et al. |
| 2013/0086213 A1 | 4/2013 | Rhyu et al. |
| 2013/0086631 A1 | 4/2013 | Archer et al. |
| 2013/0091249 A1 | 4/2013 | McHugh et al. |
| 2013/0094563 A1* | 4/2013 | Bae ................ H04N 21/236 375/240.01 |
| 2014/0036999 A1* | 2/2014 | Ryu ................ H04N 19/50 375/240.12 |
| 2015/0257035 A1* | 9/2015 | Grinshpun .......... H04L 65/4092 370/235 |

OTHER PUBLICATIONS

Gerard Fernando et al., Technology under Considerations on MPEG Media Transport, 97. MPEG Meeting, Torino Italy, Motion Picture Expert Group or ISO/IEC JTC1/SC29/WG11, No. N12170, Aug. 24, 2011, XP030018665.

\* cited by examiner

METHOD AND APPARATUS FOR CONTROLLING MEDIA DELIVERY IN MULTIMEDIA TRANSPORT NETWORK

CROSS-REFERENCE TO RELATED APPLICATION(S)

This application claims the benefit under 35 U.S.C. § 119(a) of a Korean patent application filed on Apr. 18, 2013 in the Korean Intellectual Property Office and assigned Serial number 10-2013-0043230, the entire disclosure of which is hereby incorporated by reference.

TECHNICAL FIELD

The present disclosure relates to a method and an apparatus for controlling media delivery in a multimedia transport network.

BACKGROUND

Recently, an amount of transmission of mobile data has significantly increased as a result of an expansion of mobile devices, the development of functions of the devices, and an improvement of a network bandwidth. Among various types of mobile data, a video has rapidly settled as a dominant data type in a mobile service provider network.

With increases in various content in a media transport environment and increases in content requiring High Definition (HD) and high capacity content such as Ultra HD (UHD), a data congestion status over the network has gradually increased. As a result of the data congestion over the network, data transmitted by a server is not normally delivered to a client and some of the data is lost on a route. In general, data is transmitted in the unit of Internet Protocol (IP) packets, so the data loss is generated in the unit of IP packets. Accordingly, a receiver cannot receive the IP packets due to the data loss on the network and thus cannot obtain data within the lost IP packet. Therefore, such data loss causes deterioration of audio quality, degradation of video image quality or an image breaking, an omission of a subtitle, a loss of a file, and the like, thereby inconveniencing a user. For the above described reason, a method of handling a data loss status generated on the network is required.

Particularly, considering the popularity of Internet video sites such as YouTube, Hulu, Netflix, and the like, a problem is expected to be more frequently generated in which a consumer's terminal cannot receive a seamless video service through the network. Further, due to a rapid increase speed of video traffic, available bandwidths are more quickly and greatly consumed, and accordingly, service providing companies have a huge burden to manage the network.

Particularly, a base station of a mobile network is required to transmit/receive data to/from a User Equipment (UE) within a limited frequency. When users within a range managed by the base station increase or when traffic transmitted/received by the UE increases, a congestion status of the base station may be generated. In order to handle the congestion status without deteriorating Quality of Service (QoS) which the user feels in the congestion status, a congestion control considering a user characteristic or a service application is needed. System components capable of independently performing an operation to deal with the congestion status may include a UE, a media aware network entity, and a server that transmits media.

Meanwhile, in terms of traffic transmitted to the UE, content requested by the user generally starts from an internet server and finally reaches the UE via a mobile service provider network in many cases. In a case in which the base station managed by the mobile service provider network experiences a congestion, if the user or server cannot recognize the congestion and thus attempts to request or transmit an amount of data larger than an amount which can be transmitted through the base station, the data cannot be properly transmitted to the UE, thereby significantly deteriorating QoS which the user feels.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for controlling media transport by using feedback of a User Equipment (UE) in a network.

Another aspect of the present disclosure provides a method and an apparatus for optimizing media transport in consideration of a status of a UE in a media transport system.

Another aspect of the present disclosure provides a method and an apparatus in which a server or a network apparatus properly controls media data parameters transmitted to a UE based on information on a congestion status generated in a media transport network.

In accordance with an aspect of the present disclosure, a method of controlling media delivery in a multimedia transport network is provided. The method includes transmitting Composition Information (CI) on media assets within a media package to be transmitted, to a UE, packetizing the media assets of the media package to packets, transmitting some of the packets to the UE, receiving a feedback message including information on an available bitrate determined by the UE from the UE while the some of the packets are transmitted, selecting media data, which can be transmitted according to the available bitrate, from the media package by using Asset Delivery Characteristics (ADCs) of the media assets within the media package, and packetizing the selected media data to packets and transmitting the packets to the UE.

In accordance with another aspect of the present disclosure, a method of controlling media delivery in a multimedia transport network is provided. The method includes transmitting CI on media assets within a media package to be transmitted, to a UE, packetizing the media assets of the media package to packets, transmitting some of the packets to the UE, receiving a feedback message including information on an available bitrate determined by the UE from the UE while the some of the packets are transmitted, determining a header of each Media Processing Unit (MPU) being independently decodable and splitted into a plurality of Media Fragment Units (MFUs) included in the media package, selecting media data, which can be transmitted according to the available bitrate, from the media package by using the header of each MPU, and packetizing the selected media data to packets and transmitting the packets to the UE.

In accordance with another aspect of the present disclosure, a method of controlling media delivery in a multimedia transport network is provided. The method includes transmitting CI on media assets within a media package to be transmitted, to a UE, packetizing the media assets of the media package to packets, transmitting some of the packets to the UE, receiving a feedback message including information on an available bitrate determined by the UE from the UE while the some of the packets are transmitted, selecting one or more packets, which can be transmitted according to the available bitrate, from the media package by using a header of each packet to be transmitted, and transmitting the selected one or more packets to the UE.

In accordance with another aspect of the present disclosure, an apparatus for controlling media delivery in a multimedia transport network is provided. The apparatus includes a transceiver that is configured to transmit CI on media assets within a media package to be transmitted, to a UE, to packetize the media assets of the media package to packets, to transmit some of the packets to the UE, and to receive a feedback message including information on an available bitrate determined by the UE from the UE while the some of the packets are transmitted, and a processor that is configured to select media data, which can be transmitted according to the available bitrate, from the media package by using ADCs of the media assets within the media package, to packetize the selected media data to packets, and to determine to transmit the packets to the UE.

In accordance with another aspect of the present disclosure, an apparatus for controlling media delivery in a multimedia transport network is provided. The apparatus includes a transceiver that is configured to transmit CI on media assets within a media package to be transmitted, to a UE, to packetize the media assets of the media package to packets, transmits some of the packets to the UE, and to receive a feedback message including information on an available bitrate determined by the UE from the UE while the some of the packets are transmitted, and a processor that is configured to determine a header of each MPU being independently decodable and splitted into a plurality of MFUs included in the media package, to select media data, which can be transmitted according to the available bitrate, from the media package by using the header of each MPU, to packetize the selected media data to packets, and to determine to transmit the packets to the UE.

In accordance with another aspect of the present disclosure, an apparatus for controlling media delivery in a multimedia transport network is provided. The apparatus includes a transceiver that is configured to transmit CI on media assets within a media package to be transmitted, to a UE, to packetize the media assets of the media package to packets, to transmit some of the packets to the UE, and to receive a feedback message including information on an available bitrate determined by the UE from the UE while the some of the packets are transmitted, and a processor that is configured to select one or more packets, which can be transmitted according to the available bitrate, from the media package by using a header of each packet to be transmitted, and to determine to transmit the selected one or more packets to the UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
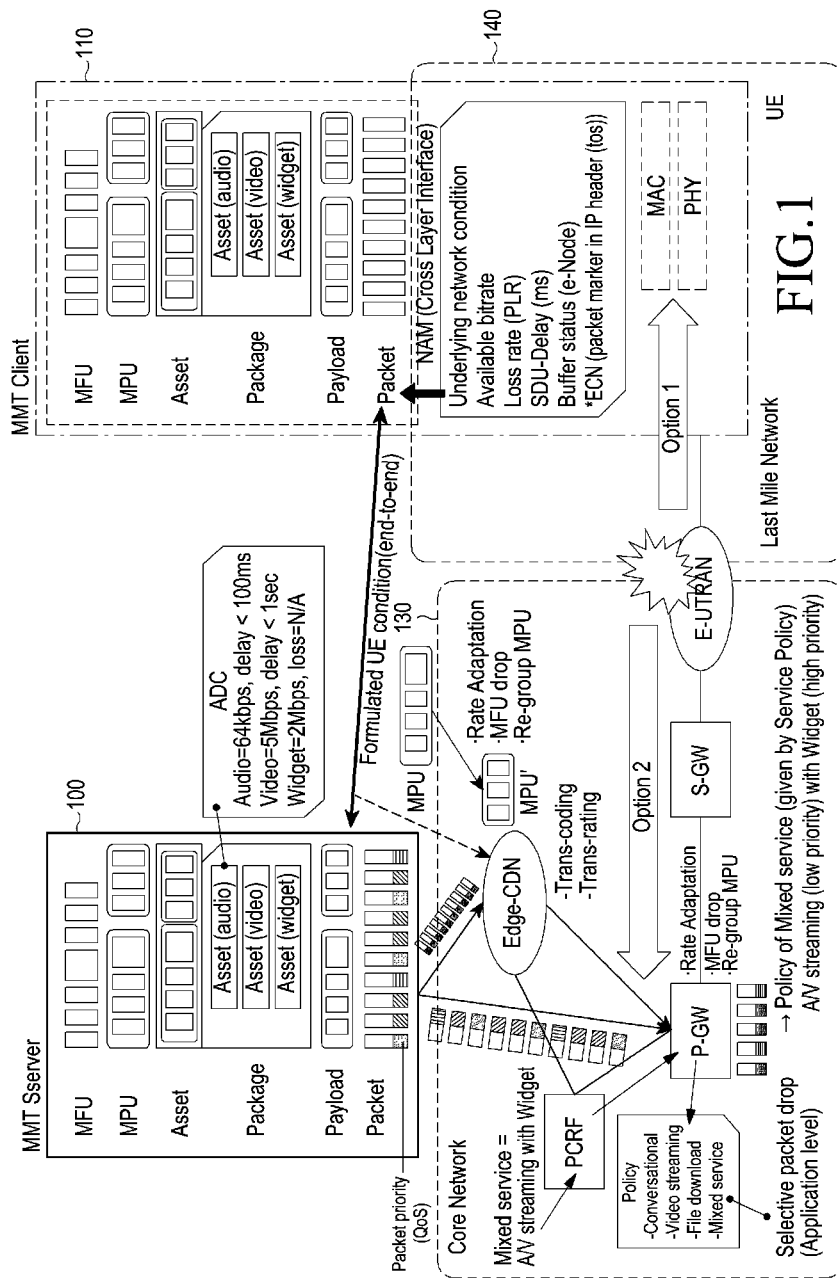
FIG. 1 illustrates a multimedia transport structure in a mobile network system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a detailed description of various embodiments of the present disclosure, it should be noted that, although a Moving Picture Experts Group (MPEG) Media Transport (MMT) technology which is one of the technologies to which the present disclosure can be applied will be described as an example, the description thereof does not limit the present disclosure.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a User Equipment (UE) may be an electronic device.

FIG. 1 illustrates an MMT media transport structure in a mobile network system according to an embodiment of the present disclosure.

Referring to FIG. 1, a mobile network system may include an MMT server 100, a core network 130, and a UE 140.

The core network 130 managed by a service provider of a mobile transmission system includes an Enhanced Node B (ENB) corresponding to a next generation base station, a Mobility Management Entity (MME) interworking with a Policy and Charging Rule Function (PCRF), a Packet Data Network Gateway (P-GW), and a Serving Gateway (S-GW).

The UE 140 includes an MMT client 110 and accesses an external network through the ENB, the S-GW, and the PDN Gateway (P-GW). An Application Function (AF) corresponds to a device exchanging information related to an application with a user in an application level. The AF may operate as a content server 100 transmitting information, particularly content data to the UE. A PCRF corresponds to a device controlling a policy related to Quality of Service (QoS) of the user and a Policy and Charging Control (PCC) rule corresponding to the policy is transferred to the P-GW and then applied.

The ENB is a Radio Access Network (RAN) node and corresponds to a Radio Network Controller (RNC) of a Universal Mobile Telecommunications System (UMTS) Terrestrial Radio Access Network (UTRAN) system and a Base Station Controller (BSC) of a Global System for Mobile Communication (GSM) Enhanced Data Rates for GSM Evolution (EDGE) Radio Access Network (GERAN). The ENB is connected to the UE through a wireless channel, and performs a similar role to a conventional RNC/BSC. In addition, the ENB may use several cells at the same time.

In LTE, because all user traffic including a real time service such as a Voice over IP (VoIP) through an Internet protocol are serviced through a shared channel, an apparatus for collecting and scheduling status information of UEs is required, and the ENB serves as the apparatus.

The S-GW is a device that provides a data bearer, and generates or removes the data bearer under a control of the MME. The MME is a device that is responsible for various control functions, and one MME may be connected to a plurality of ENBs. The MME is also connected to the S-GW and the P-GW. The PCRF is an entity that generally controls QoS and charging for traffic.

In general, a User Plane (UP) refers to a path connecting the UE to a RAN node, the RAN node to the S-GW, and the S-GW to the P-GW, through which user data is transmitted/received. In a UP path, a link using a radio channel having a highly limited resource corresponds to a path between the UE and the RAN node.

In a wireless communication system such as LTE, QoS can be applied in the unit of EPS bearers. One EPS bearer is used to transport IP flows having the same QoS requirements. QoS-related parameters may be designated to the EPS bearer and the QoS-related parameters include QoS Class Identifier (QCI) and Allocation and Retention Priority (ARP). The EPS bearer corresponds to a PDP context in a GPRS system.

According to the related art, when a congestion status is generated in a radio section, the BS handled the congestion status by controlling data transmission to the UE. For example, the BS uses technologies such as delaying traffic transmission to the UE or differential scheduling. Accordingly, the user using the UE may experience inconvenience such as service suspension due to the delay of the traffic transmission.

Various embodiments of the present disclosure described below provide a technology to solve the problem, in which a content server or MMT media processing network equipment controls media transport to effectively cope with a channel status of the UE.

Specifically, the BS may provide the UE with direct information on a transmission rate (generally referred to as bits per second) at which the UE can transmit data or a basis to determine the transmission rate, and the UE having received the transmission rate may control a transmission rate at which data is transmitted to an uplink or may ask for, when making a request for data to be transmitted to a downlink to a server, a transmission rate equal to or smaller than a preset transmission rate or make a request for transmitting data having a size and a format equal to or smaller than the preset transmission rate.

The BS may detect generation of the congestion status in the network and transmit congestion status information to the UE. According to various embodiments of the present disclosure, if the BS transmits the congestion status information to the UE, congestion status generation information of the BS may be marked on structure information of a media packet which the BS transmits to the UE.

The congestion status information transmitted to the UE may include at least one of 1) a transmission rate allowed to each UE in the congestion status, 2) a flow index indicating one of congestion profiles representing a preset congestion status, 3) an identifier simply indicating the existence or nonexistence of the congestion, 4) a value representing the relative severity of the congestion, and 5) applications or service identifiers related to the congestion status and a transmission parameter for each identifier or whether the service for each identifier is allowed.

For example, when the UE 140 desires to receive and reproduce content, the UE 140 may preset an allowed bitrate according to a congestion degree through a media profile. An index represents a congestion degree of a media profile. For example, index 0 indicates that only a Standard-Definition (SD) level content having a low bitrate can be reproduced for the UE, index 1 indicates that only an adaptive High-Definition (HD) level content having an intermediate bitrate can be reproduced, and index 2 indicates that an HD level content having a high bitrate can be reproduced.

The ENB may consider subscription information of the UE and a traffic characteristic related to the UE to determine the congestion status information. For example, the MME may provide the ENB with the traffic characteristic or QoS information as well as the subscription information, such as a membership level of the UE. For example, the subscription information of the UE may include a quality level of a content which the UE can receive, and the ENB may reflect the information to give more restrictions on the transmission rate to a UE having a lower content quality level in comparison with a UE having a higher content quality level.

Referring to FIG. 1, the ENB detects generation of the congestion status and informs the RCRF of the generation of the congestion status, and the PCRF informs the content server 100 of reception of information related to the congestion by using an interface.

Informing the content server 100 of the congestion status information by the PCRF may be performed only when it is pre-registered to inform the generation of the congestion if a congestion status event is generated between the content server 100 and the PCRF. The information transmitted to the content server 100 by the PCRF may include at least one of information on whether the congestion is generated, information on a cell in which the congestion is generated, an ID of the UE 140 (or a list of UEs), a congestion degree, and transmission parameters (media size, delay time, transmission rate, and/or the like) allowed for a corresponding service in the congestion status.

The content server 100 may control an amount of transmission media traffic according to the information informed by the PCRF and transmit QoS information (e.g., Guaranteed Bit Rate (GBR), Maximum Bit Rate (MBR) bearer, QCI, packet filtering rule, and/or the like) required for transmitting the traffic to the RCRF. Accordingly, the PCRF performs a process of allocating and changing resources required for transmitting the traffic.

Meanwhile, there are various conditions which can be used when traffic differential transmission is applied. In general, the ENB determines traffic differential transmission based on QCI which is one of QoS contexts. However, when a plurality of bearers with the same QCI are being serviced, information, by which priorities can be determined between the bearers or between various IP flows transmitted using the bearers, is required.

Some of the application traffic transmitted in a mobile communication network may not be sensitive to a transmission delay or a packet loss during the transmission. For example, the application traffic transmitted in the mobile communication network may correspond to information which the user is not required to recognize (e.g., information that the user is not required to immediately identify), such as weather information or information required for updating the UE or applications within the UE. Because such traffic does not have to be transmitted in preference to traffics of other applications in the congestion status, the traffic may be useful for controlling the congestion.

According to various embodiments of the present disclosure, controlling transmission of media data through an optimization of media by using MMT parameters of the MMT content is possible.

An MMT Protocol (MMTP) is defined as an application layer protocol for transmitting a delivery frame configured by an MMT Payload Format (PF) through an IP network. An MMT payload is configured by the MMT PF and thus designed to efficiently perform transmission. In order to efficiently transmit MPEG media data through heterogeneous IP networks, the MMT defines encapsulation formats (E), delivery protocols (D), and signaling message formats.

Figure 2A:
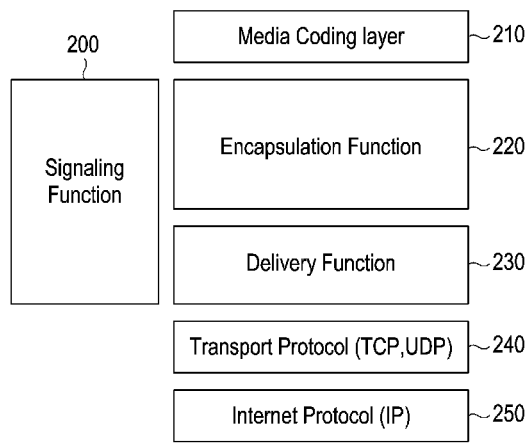
FIG. 2A illustrates a layer structure of a multimedia transport system according to an embodiment of the present disclosure.

FIG. 2A illustrates a layer structure of an MMT system according to an embodiment of the present disclosure.

Referring to FIG. 2A, a media coding layer 210, an encapsulation function layer (Layer E) 220, a delivery function layer (Layer D) 230, a transport protocol layer 240, an Internal Protocol (IP) layer 250, and a signaling layer (Layer S) 200 are illustrated to configure a multiday data packet and transmit the multimedia data packet.

The media coding layer 210 and the encapsulation function layer 220 operate as a multimedia data generator for generating multimedia data according to a multimedia content and/or a multimedia service. The delivery function layer 230 operates as a multimedia data configuration unit for configuring a multimedia data packet based on the multimedia data input from the data generator. The delivery function layer 230 corresponding to the multimedia data configuration unit identifies at least one multimedia data provided from the multimedia data generator to configure header information and combines the header information and the at least one multimedia data to configure a multimedia data packet.

Multimedia data compressed by the media coding layer 210 is packetized and output in a form similar to a file format via the encapsulation function layer 220. The encapsulation function layer 220 generates a data segment corresponding to a small unit for an MMT service based on an input of coded media data provided from or stored in the media coding layer 210 and generates access units for the MMT service by using the data segment. Further, the encapsulation function layer 220 generates a packet format for generating, storing, and transmitting complex content by combining and/or splitting the access units.

The delivery function layer 230 converts data unit(s) output from the encapsulation function layer 220 to the MMT payload format and adds an MMT transport packet header to configure an MMT packet or uses a Real-Time Protocol (RTP) corresponding to a conventional transport protocol to configure an RTP packet.

Packets configured by the delivery function layer 230 are IP-packetized by the IP layer 250 via the transport protocol layer 240 such as a User Datagram Protocol (UDP) or a Transport Control Protocol (TCP). Thereafter, the packets are transmitted. The transport protocol layer 240 and the IP layer 250 may operate as a data transmitter. The control function unit 200, which may selectively exist, generates control information or signaling information required for data transmission and adds the generated information to the data, so as to transmit the data or transmits the generated information through a separate signaling means.

The MMT payload format generated by the delivery function layer 230 defines a logical structure of media unit(s) to be transmitted by an MMT protocol or an RTP. The MMT payload is specified by a payload format for transmitting the encapsulated data unit and other information by MMT layer protocols or other conventional application transport protocols. The MMT payload provides information on streaming and information on file transfer. In streaming, a data unit may be an MMT Media Fragment Unit (MFU) or an MMT Processing Unit (MPU). For the file transfer, the data unit may be an MMT asset or an MMT package.

Figure 2B:
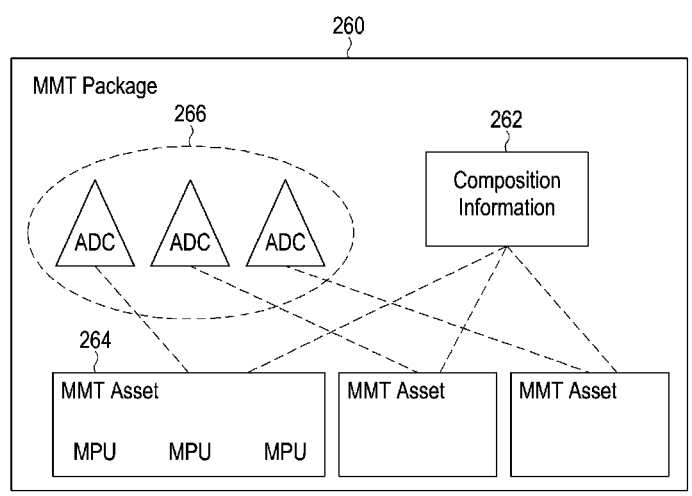
FIG. 2B illustrates a logical structure of a Moving Picture Experts Group (MPEG) Media Transport (MMT) package according to an embodiment of the present disclosure.

FIG. 2B illustrates a logical structure of the MMT package according to an embodiment of the present disclosure.

Referring to FIG. 2B, an MMT package 260 is defined as a collection of information related to coded media data processed by an MMT compliant entity. Specifically, the MMT package 260 may include one or more MMT assets 264, MMT Composition Information (MMT-CI) 262 related to the assets 264, and Asset Delivery Characteristics (ADC) 266 of each of the MMT assets 264.

The MMT payload may include at least one of one or more MFUs, one or more MPUs, one or more MMT assets, and the MMT package. The MPU is a general container format including data independent from a specific media codec (e.g., data independently decodable by a media decoder) and may provide characteristic information of media data. The MFU is one fragment of the MPU and may be a minimum unit of media data. For example, when an encoding is performed using one frame as an access unit, the MFU may be one video frame or may be one slice included in one frame.

The MPU is a container format including one or more MFUs and information related to additional transmission and processing, and may be fragmented into various numbers of MFUs generated from a plurality of different access units. The MPU refers to a coded media data unit which can be completely and independently processed by the MMT compliant entity, and may have a specific size (e.g., one Group Of Picture (GOP) in a case of a video) according to an application environment. For example, the MPU may include a plurality of picture frames constituting one GOP (e.g., one second video) and the MFU may include each picture frame.

The MMT asset is a data entity including one or more MPUs and corresponds to a largest data unit to which the same Composition Information (CI) and a transport characteristic are applied. The MMT asset includes only one type data including packetized or multiplexed data. For example, at least a portion of audio Elementary Stream (ES), at least a portion of video ES, an MPEG-U (User Interface) widget package, a least a portion of MPET-2 Transport Stream (TS), at least a portion of an MPEG-4 (MP4) file, and a whole or at least a portion of the MMT package may be each MMT asset.

The MMT-CI refers to information defining a spatial and temporal relationship of MMT assets and the MMT-TC defines Quality of Service (QoS) required for transmitting the MMT assets. The MMT-TC may be indicated by Asset Delivery Characteristics (ADCs) for a specific delivery environment.

According to various embodiments of the present disclosure, media traffic transport may be controlled using at least one of information on the MPU and the MFU, information on the MMT payload and the MMT packet, QoS information, media identification information, and the like.

Figure 3A:
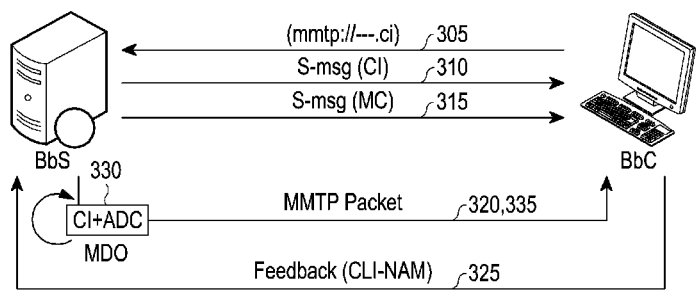
FIGS. 3A and 3B illustrate a media transport controlling operation and a signal flow according to an embodiment of the present disclosure.
Figure 3B:
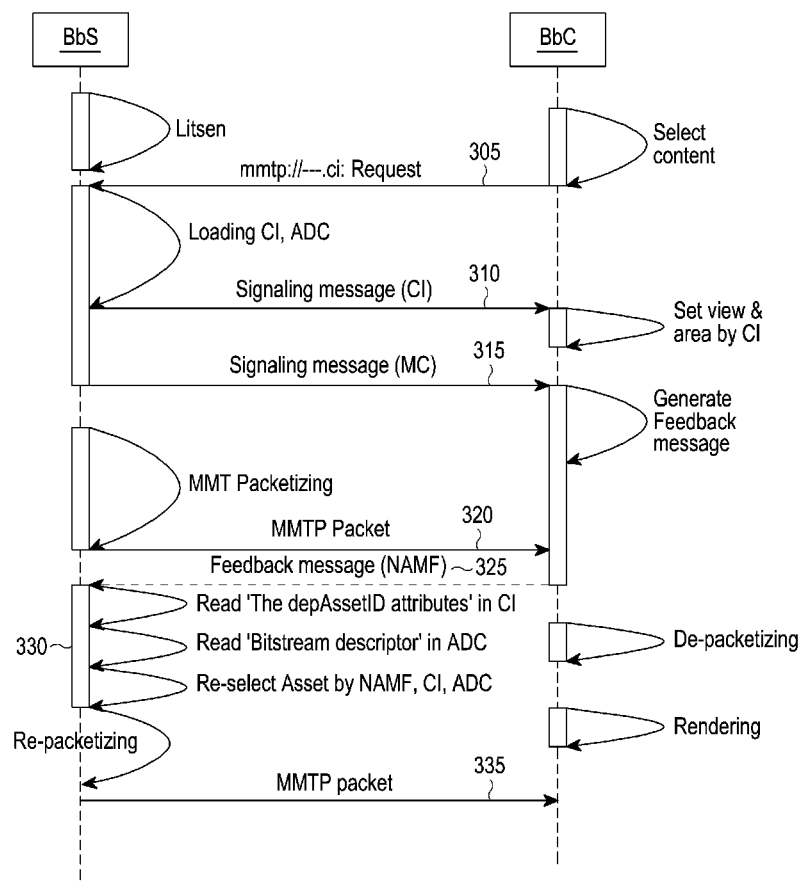

According to an embodiment of the present disclosure illustrated in FIGS. 3A and 3B, the UE having a Broadcast bearer Client (BbC) function provides feedback information required for controlling traffic to the content server having a Broadcast bearer Server (BbS) function and the content server controls an amount of the media traffic transport based on the feedback information. Specifically, the content server may control the amount of the transmitted traffic by controlling a number of transmitted media streams.

FIGS. 3A and 3B illustrate a media transport controlling operation and a signal flow according to an embodiment of the present disclosure.

Referring to FIGS. 3A and 3B, the BbC selects a content to be consumed and transmits a request for the content to the BbS in operation 305. A format of a message for the request may be, for example, "mmtp://~~~.ci".

In operation 310, the BbS identifies an MMT package including the requested content and transmits a signaling message including CI related to the requested content to the BbC. The CI may include depAssetID which is a dependent asset identifier for identifying assets related to the requested content. The dependent asset is an asset having information related to an original asset. For example, a main asset may be related to an image and the dependent asset may be related to a text subtitle.

In operation 315, the BbS may transmit a Measurement Configuration (MC) message which is a signaling message including a configuration for making a request for feedback of a measurement report to the BbC. For example, the MC message makes a request for information on a packet transmission rate and a delay time of packets transmitted to the BbC from the BbS. When the configuration for the feedback of the measurement report is preset, operation 315 may be omitted.

In operation 320, the BbS packetizes assets including media data related to the content in an order of MPU(s), MFU(s), MMT payload (s), and MMT packet(s) and then transmits the assets to the BbC. For example, the MMT packets may be unicasted to the BbC by using the MMTP.

Each of the MPUs includes an MPU header and an MDAT (Metadata) box including media metadata. The MPU header includes at least one of asset_type providing a type of an asset to which the MPU belongs to, asset_ID scheme indicating a scheme of an ID of the asset, asset_ID_length indicating a length of the ID of the asset, and asset_ID_value including the ID of the asset. Each of the MFUs is provided in one segment unit included in the corresponding MPU. Header information of each MMT packet includes at least one of packet_id including a unique identifier of the corresponding asset, packet_sequence_number including an integer value for distinguishing packets having the same packet_id, and timestamp specifying a time instance of the MMP payload.

In operation 325, the BbC transmits a feedback message to the BbS. According to various embodiments of the present disclosure, the BbC may transmit the feedback message to the BbS according to a predetermined feedback period "t" while the BbC transmits MMT packets. The feedback message may include an available bitrate or a Packet Error Rate (PER) (or Bit Error Rate (BER)) determined by the BbC. A configuration (period or the like) for the feedback may be set or predetermined using an MC message by the BbS.

The feedback message may be a Network Abstraction for Media (NAM) Feedback (NAMF) message for Cross Layer Interface (CLI) feedback among MMT signaling messages provided by the MMTP and includes channel data such as a bitrate or a Packet Loss Rate (PLR) and CLI NAM parameters such as a maximum MPU size. The CLI is an interface for exchanging information between a media application layer and a transport layer (RAN), and the CLI NAM parameters are values indicating status information of the RAN which are expressed to be understood by the server or the UE and may include, for example, a media packet loss rate, a delay time, and a maximum media transport data size.

In operation 330, the BbS controls traffic transport by using a CI and an ADC within the MMT package based on the feedback message. A detailed operation performed by the BbS is described below.

First, the BbS identifies a type of each asset (e.g., video asset or audio asset) by using asset information within the CI (e.g., depAssetID) and identifies a bitrate of each asset from the ADC. The ADC includes a bitstream descriptor including a bitrate of the corresponding asset. The BbS renders NAM information included in the feedback message to select one or more assets which can be transmitted even in a current state of the BbC.

In operation 335, the BbS packetizes the selected assets in an order of MPU(s), MFU(s), MMT payload(s), and MMT packet(s) and transmits the packetized assets. For example, the BbS packetizes only the selected assets in an order of MPU(s), MFU(s), MMT payload(s), and MMT packet(s).

Thereafter, the BbC de-packetizes the received MMT packets and provides image/audio data based on assets extracted from the received MMT packets. For example, the BbC de-packetizes the received MMT packets and provides image/audio data based on only assets extracted from the received MMT packets.

MMT parameters used in each entity according to an embodiment of FIGS. 3A and 3B are as shown in Table 1. In Table 1 below, a transmission entity refers to the BbS and a reception entity refers to the BbC.

TABLE 1

| | Items | Sending entity | Receiving entity | QoS management Feedback msg. | MANE |
|---|---|---|---|---|---|
| Layer E | CI | The depAssetID attributes | All elements | N/A | N/A |
| | ADC | bitstream_descriptor | N/A | N/A | |
| | MPU | MPU header: MPU Metadat, MDAT, asset_type, asset_ID_scheme, asset_ID_length, asset_ID_value | MPU header: MPU Metadat, MDAT | N/A | |
| | MFU | Video segment | Video segment | N/A | |
| Layer D | MMT payload | type: MPUs, signaling message | type: MPUs, signaling message | signaling message | |
| | MMT packet | packet_id, packet_sequence_number timestamp | packet_id, packet_sequence_number timestamp | N/A | |
| | CLI | NAM | NAM | available_bitrate, BER (8.2) | |
| Layer S | Signaling for E | PA, MCI, CRI, DCI | PA, MCI, CRI, DCI, | N/A | |
| | Signaling for D | MC | NAMF | NAMF (9.4.7) | |

Hereinafter, the Package Access (PA) refers to a control information message including a path such as address information for an access to a package provided based on an MMT technology. The Media Composition Information (MCI) refers to a control information message including screen configuration information of media (position and time information on a screen) expressed by the MMT technology. The Clock Relation Information (CRI) is signaling information for synchronization of a media reproduction time between a server and a client and refers to a control information message including time information for synchronization between an MMT system and an MPEG-2TS system as well as synchronization between MMT systems. The Device Capability Information (DCI) refers to a control information message including media reproduction capability information of a device required to provide an MMT service.

Figure 4A:
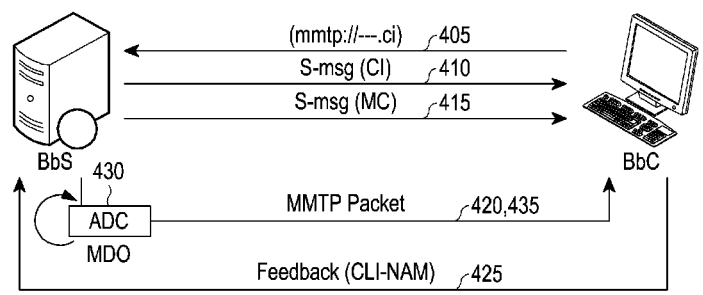
FIGS. 4A and 4B illustrate a media transport controlling operation and a signal flow according to an embodiment of the present disclosure.
Figure 4B:
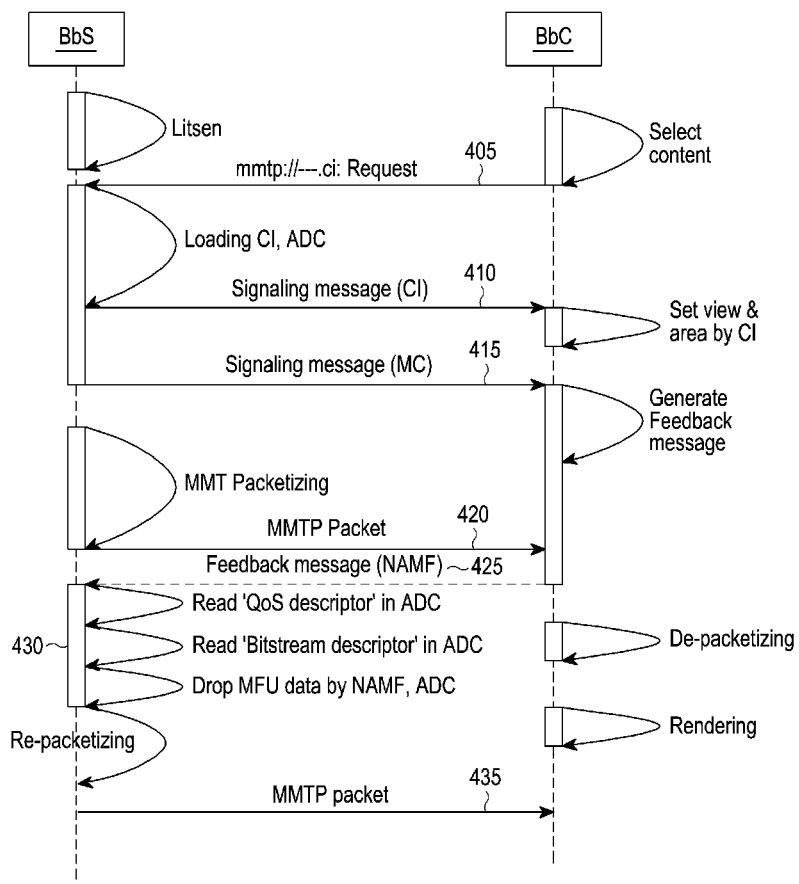

According to an embodiment of the present disclosure illustrated in FIGS. 4A and 4B, the UE having the BbC provides information required for a traffic control to the content server having the BbS and the content server controls an amount of traffic of media transport based on the information. Specifically, the content server selects a single media type of which transmission is to be optimized and controls a frame rate/size of the corresponding media data, so as to control the amount of the transmitted traffic.

FIGS. 4A and 4B illustrate a media transport controlling operation and a signal flow according to an embodiment of the present disclosure.

Referring to FIGS. 4A and 4B, the BbC selects a content to be consumed and transmits a request for the content to the BbS in operation 405. A format of a message for the request may be, for example, "mmtp://~~~.ci".

In operation 410, the BbS identifies an MMT package including the requested content and transmits a signaling message including CI related to the requested content to the BbC.

In operation 415, the BbS may transmit a MC message including a configuration for making a request for feedback of a measurement report to the BbC. Operation 415 may be selectively performed.

In operation 420, the BbS packetizes assets including media data related to the content in an order of MPU(s), MFU(s), MMT payload (s), and MMT packet(s) and then transmits the assets to the BbC. For example, the MMT packets may be unicasted to the BbC by using the MMTP.

Each of the MPUs includes an MPU header and an MDAT (Metadata) box including media metadata. Further, each of the MPUs may include an MMT hint track indicating a boundary of MFUs, and the MMT hint track includes packet_id which is a unique identifier for the asset to which this hint track is applied, has_mfus_flag which is a flag indicating whether the MPUs are fragmented into MFUs or not, and sequence_number which is an integer number that indicates the sequencing order of this MFU within the MPU.

Each of the MFUs is provided in one segment unit included in the corresponding MPU. Header information of each MMT packet includes at least one of packet_id including a unique identifier of the corresponding asset, packet_sequence_number including an integer value for distinguishing packets having the same packet_id, and timestamp specifying a time instance of the MMP payload.

In operation 425, the BbC transmits a feedback message to the BbS. According to various embodiments of the present disclosure, the BbC may transmit the feedback message to the BbS according to a predetermined feedback period "t" while the BbC transmits MMT packets. The feedback message may be an MMTP NAM message and may include an available bitrate or a PER (or BER) determined by the BbC. The feedback message may be an NAMF message for CLI feedback among MMT signaling messages provided by the MMTP and include channel data such as a bitrate or a PLR and CLI NAM parameters such as a maximum MPU size.

In operation 430, the BbS controls traffic transport by using the ADC within the MMT package based on the feedback message. A detailed operation performed by the BbS is described below.

First, the BbS identifies a bitrate of each asset by rendering the ADC within the MMT package. For example, the ADC includes a QoS descriptor indicating a priority of the corresponding asset and a bitstream descriptor including a bitrate of the corresponding asset. The BbS identifies a bitrate which can be transmitted in a current state of the BbC (e.g., which can be received in a state of the BbC) by rendering NAM information included in the feedback message. Thereafter, the BbS determines whether to transmit the corresponding asset by using priority information within "QoS descriptor" and "bitstream descriptor" of each ADC and selects assets to be transmitted. The BbS excludes (e.g., drops) one or more MFUs from the transmission according to an available bitrate and selects the remaining MFUs by parsing a header of each MPU within the selected assets.

In operation 435, the BbS packetizes the selected MFUs and transmits the packetized MFUs. Thereafter, the BbC de-packetizes the received MMT packets and provides image/audio data based on media data of MFUs extracted from the received MMT packets.

MMT parameters used in each entity according to an embodiment of the present disclosure illustrated in FIGS. 3A and 3B are as shown in Table 2. In Table 2 below, a transmission entity refers to the BbS and a reception entity refers to the BbC.

TABLE 2

|  | Items | Sending entity | Receiving entity | QoS management Feedback msg. | MANE |
|---|---|---|---|---|---|
| Layer E | CI | Just delivery | All elements | N/A | N/A |
|  | ADC | QoS_descriptor bitstream_descriptor | N/A | N/A |  |
|  | MPU | MPU header: MPU Metadat, MDAT, MMT Hint Track: packet_id, has_mfus_flag, sequence_number, | MPU header: MPU Metadat, MDAT | N/A |  |
|  | MFU | Video segment | Video segment | N/A |  |
| Layer D | MMT payload | type: MPUs, signaling message | type: MPUs, signaling message | signaling message |  |
|  | MMT packet | packet_id, packet_sequence_number timestamp | packet_id, packet_sequence_number timestamp | N/A |  |
|  | CLI | NAM | NAM | available_bitrate, BER (8.2) |  |
| Layer S | Signaling for E | PA, MCI, CRI, DCI, SSWR | PA, MCI, CRI, DCI, SSWR | N/A |  |
|  | Signaling for D | MC | NAMF | NAMF (9.4.7) |  |

Hereinafter, the Package Access (PA) refers to a control information message including a path such as address information for an access to a package provided based on an MMT technology. The Media Composition Information (MCI) refers to a control information message including screen configuration information of media (position and time information on a screen) expressed by the MMT technology. The Clock Relation Information (CRI) is signaling information for synchronization of a media reproduction time between a server and a client and refers to a control information message including time information for synchronization between an MMT system and an MPEG-2TS system as well as synchronization between MMT systems. The Security SW Request (SSWR) refers to a control information message to transmit a security/encryption key for providing an MMT service.

Figure 5A:
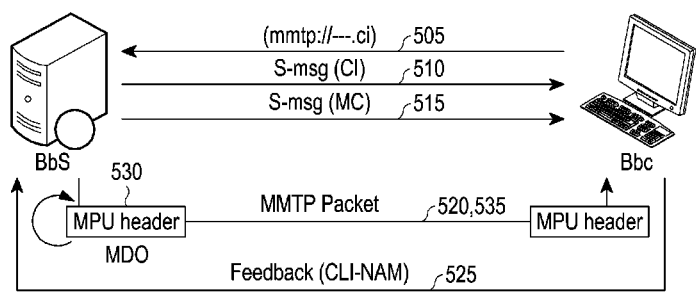
FIGS. 5A and 5B illustrate a media transport controlling operation and a signal flow according to an embodiment of the present disclosure.
Figure 5B:
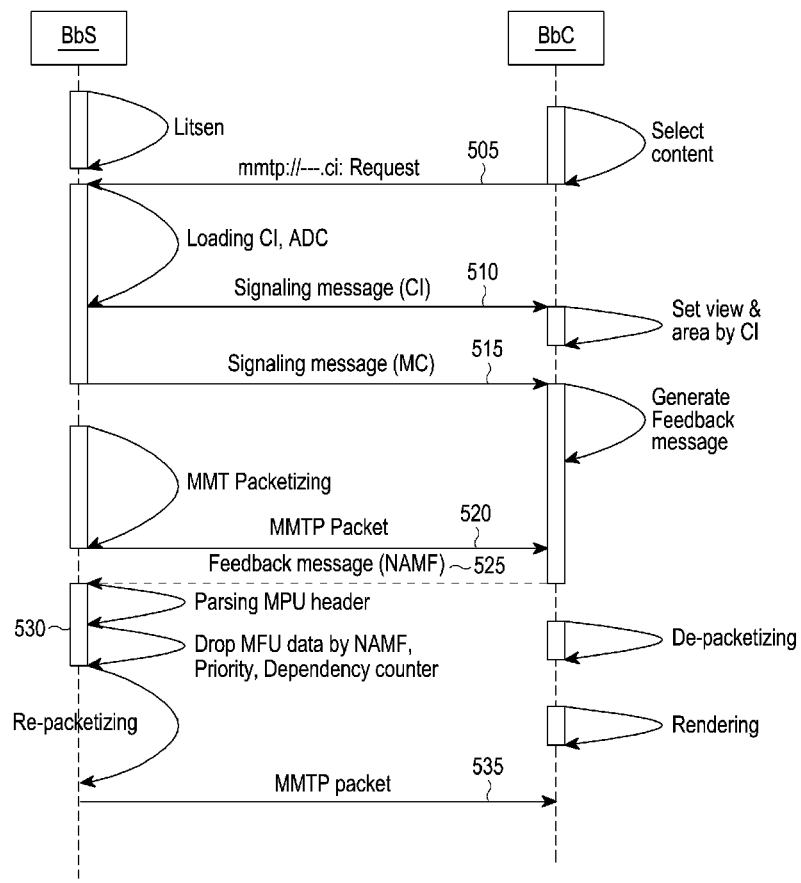

According to an embodiment of the present disclosure illustrated in FIGS. 5A and 5B, the UE having the BbC provides information required for a traffic control to the content server having the BbS and the content server controls an amount of traffic of media transport based on the information. Specifically, transport optimization made by the content server may control an amount of transmitted traffic through a priority of a frame of corresponding media data, a correlation of frames and a process of generating transport packets after controlling a reproduction frame speed and a media data size.

FIGS. 5A and 5B illustrate a media transport controlling operation and a signal flow according to an embodiment of the present disclosure.

Referring to FIGS. 5A and 5B, the BbC selects a content to be consumed and transmits a request for the content to the BbS in operation 505. A format of a message for the request may be, for example, "mmtp://~~~.ci".

In operation 510, the BbS identifies an MMT package including the requested content and transmits a signaling message including CI corresponding to the requested content to the BbC.

In operation 515, the BbS may transmit a MC message including a configuration for making a request for feedback of a measurement report to the BbC. Operation 515 may be selectively performed.

In operation 520, the BbS packetizes assets including media data related to the content in an order of MPU(s), MFU(s), MMT payload (s), and MMT packet(s) and then transmits the assets to the BbC. For example, the MMT packets may be unicasted to the BbC by using the MMTP.

Each of the MPUs includes an MPU header and an MDAT (Metadata) box including media metadata. Further, each of the MPUs may include an MMT hint track indicating a boundary of MFUs, and the MMT hint track includes at least one of packet_id which is a unique identifier of an asset to which the corresponding hint track is applied, has_mfus_flag which is a flag indicating whether MPUs are split into MFUs, sequence_which is an integer indicating a sequencing order of the MFUs within the MPU, priority indicating a relative priority of the MFUs against other MFUs, dependency_counter indicating a number of MFUs whose decoding is dependent on the corresponding MFU, offset indicating an offset of media data included in the corresponding MFU, and a length of the data corresponding to the corresponding MFU in bytes.

Each of the MFUs is provided in one segment unit included in the corresponding MPU. Header information of each MMT packet includes at least one of packet_id including a unique identifier of the corresponding asset, packet_sequence_number including an integer value for distinguishing packets having the same packet_id, timestamp specifying a time instance of the MMP payload, QoS_classifier_flag, reliability_flag and transmission_priority.

Here, the QoS_classifier_flag and the reliability_flag correspond to flag information for configuring a delay sensitivity (whether an MMT packet delay is allowed) and a transmission reliability (whether an MMT packet loss is allowed) in an MMT environment and may be determined when information related to QoS transmission is transferred, through whether the corresponding information is allowed. According to whether the packet is lost and delayed, the information may be used to provide a QoS guarantee scheme suitable for the corresponding packet transmission.

The QoS_classifier_flag, the reliability_flag, and the transmission_priority are defined as follows.

QoS_classifier_flag (Q: 1 bit)—When set to '1', it indicates that QoS classifier information is used. QoS classifier contains delay_sensitivity field, reliability_flag field, and transmission_priority field. It indicates the QoS class property. The application can perform per-class QoS operations according to the specific value of one property. The class values are universal to all independent sessions.

reliability_flag (R: 1 bit)—When "reliability_flag" is set to '0', the reliability_flag shall indicate that the data is loss tolerant (e.g., media data), and that the following 3-bits shall be used to indicate relative priority of loss. When "reliability_flag" is set to '1', the "transmission_priority" field will be ignored, and shall indicate that the data is not loss tolerant (e.g., signalling data, service data, or program data).

transmission_priority (TP: 3 bits)—The transmission_priority field provides the transmission_priority for the media packet. The transmission_priority field may be mapped to the Network Abstraction Layer (NAL) Reference Identification (NRI), a Differentiated Services Code Point (DSCP) of the Internet Engineering Task Force (IETF), or other loss priority field in another network protocol. The transmission_priority field shall take values from '7' ('1112') to '0' ('0002'), where 7 is the highest priority, and '0' is the lowest priority.

In operation 525, the BbC transmits a feedback message to the BbS. According to various embodiments of the present disclosure, the BbC may transmit the feedback message to the BbS according to a predetermined feedback period "t" while the BbC transmits MMT packets. The feedback message may be an MMTP NAM message and may include an available bitrate or a PER (or BER) determined by the BbC. The feedback message may be an NAM feedback message for CLI feedback among MMT signaling messages provided by the MMTP and include channel data such as a bitrate or a PLR and CLI NAM parameters such as a maximum MPU size.

In operation 530, the BbS controls traffic transport in the unit of MPUs (MPU level) by using the MPU header of each MPU within the MMT package based on the feedback message. A detailed operation performed by the BbS is described below.

First, the BbS analyzes NAM information of the feedback message to determine a current channel status of the BbC (e.g., a bitrate or a PER). Next, the BbS analyzes an MPU header of each MPU to be transmitted to read priority information and selects MFUs to be dropped by using the priority information of the MPU header and dependency_counter in accordance with an available bitrate. Because the priority of the MPU header is a unit of the MFU, the dropping of the MFUs is performed in the unit of MFUs.

In operation 535, the BbS packetizes the remaining selected MFUs except for the dropped MFUs and transmits the MFUs.

Thereafter, the BbC de-packetizes the received MMT packets and provides image/audio data based on MFUs extracted from the received MMT packets. For example, the BbC de-packetizes the received MMT packets and provides image/audio data based on only MFUs extracted from the received MMT packets. For example, the BbC receives a content (frame drop) of which some MFU data has been lost within a specific MPU.

MMT parameters used in each entity according to an embodiment of the present disclosure illustrated in FIGS. 5A and 5B are as shown in Table 3. In Table 3 below, a transmission entity refers to the BbS and a reception entity refers to the BbC.

transmits the assets to the BbC. For example, the MMT packets may be unicasted to the BbC by using the MMTP.

Each of the MPUs includes an MPU header and an MDAT (Metadata) box including media metadata. Further, each of the MPUs may include an MMT hint track indicating a

TABLE 3

| | Items | Sending entity | Receiving entity | QoS management | |
|---|---|---|---|---|---|
| | | | | Feedback msg. | MANE |
| Layer E | CI | Just delivery | All elements | N/A | N/A |
| | ADC | QoS_descriptor bitstream_descriptor | N/A | N/A | |
| | MPU | MPU header: MPU Metadat, MDAT, MMT Hint Track: packet_id, has_mfus_flag, sequence_number, priority, dependency_counter, offset, length | MPU Metadat, MDAT | N/A | |
| | MFU | Video segment | Video segment | N/A | |
| Layer D | MMT payload | type: MPUs, signaling message | type: MPUs, signaling message | signaling message | |
| | MMT packet | packet_id, packet_sequence_number timestamp, QoS_classifier_flag, transmission_priority | packet_id, packet_sequence_number timestamp | N/A | |
| | CLI | NAM | NAM | available_bitrate, BER (8.2) | |
| Layer S | Signaling for E | PA, MCI, MPT, CRI, DCI, SSWR | PA, MCI, MPT, CRI, DCI, SSWR | | |
| | Signaling for D | MC | NAMF | NAMF (9.4.7) | |

Figure 6A:
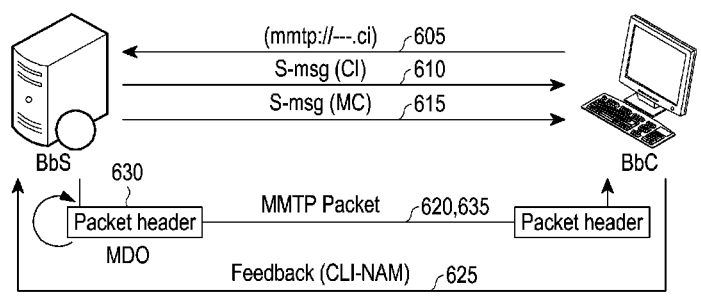
FIGS. 6A and 6B illustrate a media transport controlling operation and a signal flow according to an embodiment of the present disclosure.
Figure 6B:
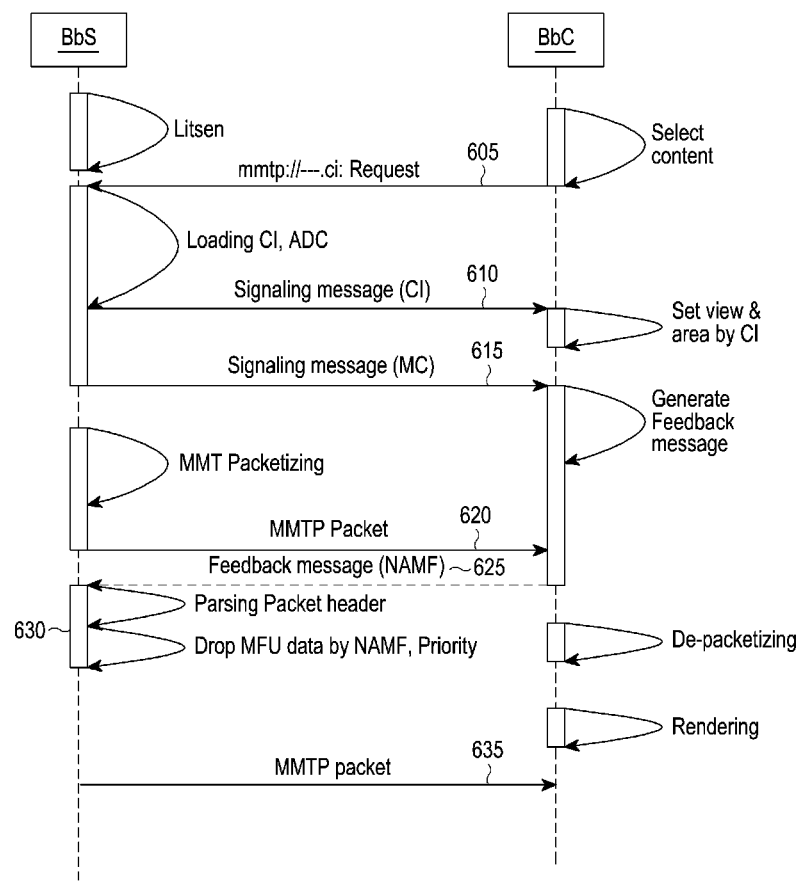

According to an embodiment of the present disclosure illustrated in FIGS. 6A and 6B, the UE having the BbC provides information required for a traffic control to the content server having the BbS and the content server controls an amount of traffic of media transport based on the information. Specifically, the transport optimization made by the content server may control an amount of traffic of the corresponding transmission media packet by determining a priority according to an importance of generated transport packets and determining a transmission order and whether to perform the transmission.

FIGS. 6A and 6B illustrate a media transport controlling operation and a signal flow according to an embodiment of the present disclosure.

Referring to FIGS. 6A and 6B, the BbC selects a content to be consumed and transmits a request for the content to the BbS in operation 605. A format of a message for the request may be, for example, "mmtp://~~~.ci".

In operation 610, the BbS identifies an MMT package including the requested content and transmits a signaling message including CI corresponding to the requested content to the BbC.

In operation 615, the BbS may transmit a MC message including a configuration for making a request for feedback of a measurement report to the BbC. Operation 615 may be selectively performed.

In operation 620, the BbS packetizes assets including media data related to the content in an order of MPU(s), MFU(s), MMT payload (s), and MMT packet(s) and then boundary of MFUs, and includes at least one of packet_id which is a unique identifier of an asset to which the corresponding hint track is applied, priority indicating a relative priority of an MFU against other MFUs within one MPU, and dependency_counter indicating a number of MFUs whose decoding is dependent on the corresponding MFU.

Each of the MFUs is provided in one segment unit included in the corresponding MPU. Header information of each MMT packet includes at least one of packet_id including a unique identifier of the corresponding asset, packet_sequence_number including an integer value for distinguishing packets having the same packet_id, timestamp specifying a time instance of the MMP payload, QoS_classifier_flag, and transmission_priority.

In operation 625, the BbC transmits a feedback message to the BbS. According to various embodiments of the present disclosure, the BbC may transmit the feedback message to the BbS according to a predetermined feedback period "t" while the BbC transmits MMT packets. The feedback message may be an MMTP NAM message and may include an available bitrate or a PER (or BER) determined by the BbC. The feedback message may be an NAM feedback message for CLI feedback among MMT signaling messages provided by the MMTP and include channel data such as a bitrate or a PLR and CLI NAM parameters such as a maximum MPU size.

In operation 630, the BbS controls traffic transport in the unit of MMT packets (MMT packet level) by using a packet header of each MMT packet to be transmitted, based on the feedback message. A detailed operation performed by the BbS is described below.

First, the BbS analyzes NAM information of the feedback message to determine a current channel status of the BbC (e.g., a bitrate or a PER). Next, the BbS analyzes the packet header of each MMT packet to be transmitted to read priority information and determines packets to be dropped in an order of a packet having a lower priority by using the priority information of the packet header in accordance with an available bitrate. Because the priority of the packet header is a unit of the MFU, the dropping of the packets is performed in the unit of packets. At this time, the BbS is not required to analyze the MPU level and analyzes the corresponding packet header before transmitting each MMT packet to select whether to transmit the packet. For example, the BbS may analyze only the corresponding packet header before transmitting each MMT packet to select whether to transmit the packet.

In operation 635, the BbS transmits the remaining selected MMTs except for the dropped MMT packet to the BbC.

Thereafter, the BbC de-packetizes the received MMT packets and provides image/audio data. For example, the BbC de-packetizes only the received MMT packets and provides image/audio data. For example, the BbC receives a content (frame drop) of which MMT packets corresponding to some MFU data have been lost within a specific MPU.

MMT parameters used in each entity according to an embodiment of the present disclosure illustrated in FIGS. 6A and 6B are as shown in Table 4. In Table 4] below, a transmission entity refers to the BbS and a reception entity refers to the BbC.

according to a media transport characteristic. Specifically, the MANE may control the amount of the transmitted traffic by controlling a number of transmitted media streams.

Figure 7A:
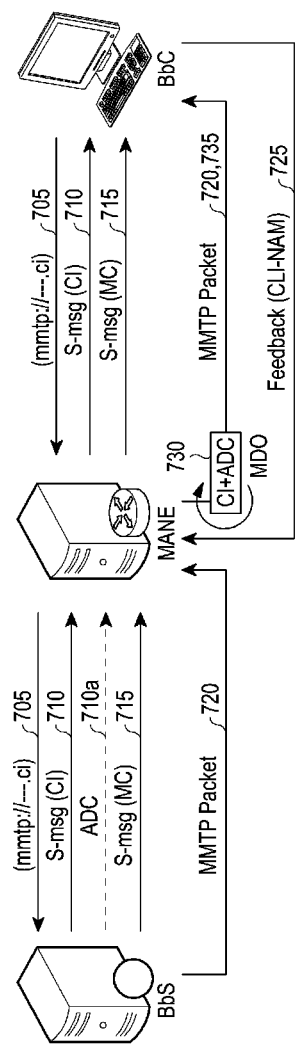
FIGS. 7A and 7B illustrate a media transport controlling operation and a signal flow according to an embodiment of the present disclosure.
Figure 7B:
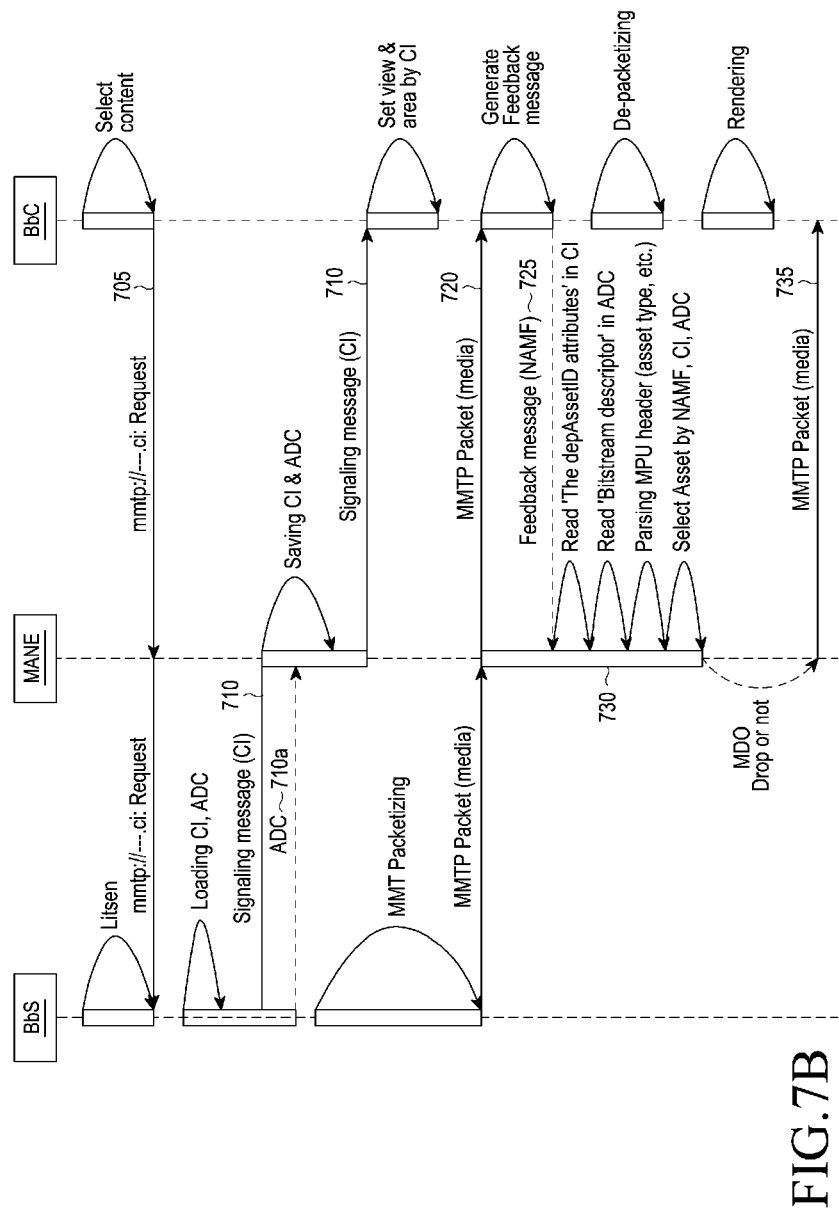

FIGS. 7A and 7B illustrate a media transport controlling operation and a signal flow by a network intermediate entity according to an embodiment of the present disclosure.

Referring to FIGS. 7A and 7B, the BbC selects a content to be consumed and transmits a request for the content to the content server having the BbS via the MANE in operation 705. A format of a message for the request may be, for example, "mmtp://~~~.ci".

The BbS identifies an MMT package including the requested content, and transmits a CI and an ADC related to the requested content to the MANE in operations 710 and 710a. According to various embodiments of the present disclosure, the ADC may be transmitted using the MMTP or another protocol (e.g., TCP or UDP). Thereafter, the MANE stores the received ADC and CI so that the stored ADC and CI can be used for a traffic control in the future and transmits the CI to the BbC.

In operation 715, the BbS may transmit a MC message including a configuration for making a request for feedback of a measurement report to the BbC. When the configuration for the feedback of the measurement report is preset, operation 715 may be omitted.

In operation 720, the BbS packetizes assets including media data related to the content in an order of MPU(s), MFU(s), MMT payload (s), and MMT packet(s) and then transmits the assets to the MANE. The MANE transmits the received MMT packets to the BbC. The MMT packets may be unicasted to the BbC by using the MMTP.

Each of the MPUs includes an MPU header and MDAT (Metadata) box including media metadata. The MPU header

TABLE 4

| | | | | QoS management | |
|---|---|---|---|---|---|
| | Items | Sending entity | Receiving entity | Feedback msg. | MANE |
| Layer E | CI | Just delivery | All elements | N/A | N/A |
| | ADC | QoS_descriptor bitstream_descriptor | N/A | N/A | |
| | MPU | MPU header: MPU Metadat, MDAT, MMT Hint Track: packet_id, priority, dependency_counter, | MPU Metadat, MDAT | N/A | |
| | MFU | Video segment | Video segment | N/A | |
| Layer D | MMT payload MMT packet | type: MPUs, signaling message packet_id, packet_sequence_number timestamp, QoS_classifier_flag, transmission_priority | type: MPUs, signaling message packet_id, packet_sequence_number timestamp | signaling message N/A | |
| | CLI | NAM | NAM | available_bitrate, BER (8.2) | |
| Layer S | Signaling for E | PA, MCI, MPT, CRI, DCI, SSWR | PA, MCI, MPT, CRI, DCI, SSWR | N/A | |
| | Signaling for D | MC | NAMF | NAMF (9.4.7) | |

According to an embodiment of the present disclosure illustrated in FIGS. 7A and 7B, the UE having the BbC provides information required for a traffic control to a Media Aware Network Entity (MANE) and the MANE controls an amount of traffic of media transport based on the information. The MANE may be implemented by adding an MANE function to the ENB, the P-GW, the S-GW, and the MME illustrated in FIG. 1 and may be used as a dedicated MANE includes at least one of asset_type providing a type of an asset to which the MPU belongs to, asset_ID scheme indicating a scheme of an ID of the asset, asset_ID_length indicating a length of the ID of the asset, and asset_ID_value including the ID of the asset. Each of the MFUs is provided in one segment unit included in the corresponding MPU. Header information of each MMT packet includes at least one of packet_id including a unique identifier of the corresponding asset, packet_sequence_number including an integer value for distinguishing packets having the same packet_id, and timestamp specifying a time instance of the MMP payload.

In operation 725, the BbC transmits a feedback message to the MANE. According to various embodiments of the present disclosure, the BbC may transmit the feedback message to the MANE according to a predetermined feedback period "t" while the MANE transmits MMT packets. The feedback message may include an available bitrate or a PER (or BER) determined by the BbC. A configuration for the feedback may be set or predetermined using an MC message by the BbS.

Thereafter, the BbC de-packetizes the received MMT packets and provides image/audio data based on assets extracted from the received MMT packets. For example, the BbC de-packetizes only the received MMT packets and provides image/audio data based on only assets extracted from the received MMT packets. For example, the BbC receives only the assets selected by the MANE.

MMT parameters used in each entity according to an embodiment of the present disclosure illustrated in FIGS. 7A and 7B are as shown in Table 5. In Table 5 below, a transmission entity refers to the BbS and a reception entity refers to the BbC. Parameters for QoS management are used by the MANE.

TABLE 5

| | Items | Sending entity | Receiving entity | QoS management | |
|---|---|---|---|---|---|
| | | | | Feedback msg. | MANE |
| Layer E | CI | Just delivery | All elements | N/A | The depAssetID attributes |
| | ADC | Delivery to MANE | N/A | N/A | bitstream_descriptor |
| | MPU | MPU header: MPU Metadat, MDAT | MPU header: MPU Metadat, MDAT | N/A | MPU header: asset_type, asset_ID_scheme, asset_ID_length, asset_ID_value |
| | MFU | Video segment | Video segment | N/A | N/A |
| Layer D | MMT payload | type: MPUs, signaling message | type: MPUs, signaling message | signaling message | N/A |
| | MMT packet | packet_id, packet_sequence_number timestamp | packet_id, packet_sequence_number timestamp | N/A | N/A |
| | CLI | N/A | NAM | available_bitrate, BER (8.2) | NAM |
| Layer S | Signaling for E | PA, MCI, MPT, CRI, DCI, SSWR | PA, MCI, MPT, CRI, DCI, SSWR | N/A | N/A |
| | Signaling for D | MC | NAMF | NAMF (9.4.7) | MC |

The feedback message may be an NAMF message for CLI feedback among MMT signaling messages provided by the MMTP and include channel data such as a bitrate or a PLR and CLI NAM parameters such as a maximum MPU size.

In operation 730, the MANE controls traffic transport by using the pre-stored CI and ADC based on the feedback message. A detailed operation performed by the MANE is described below.

First, the MANE identifies a type of each asset (e.g., video asset or audio asset) by using asset information within the stored CI (e.g., depAssetID) and identifies a bitrate of each asset by analyzing the stored ADC. The ADC includes a bitstream descriptor including a bitrate of the corresponding asset. The MANE analyzes NAM information included in the feedback message to select one or more assets which can be transmitted in a current state of the BbC.

In operation 735, the MANE packetizes the selected asset and transmits generated MMT packet(s) to the BbC. For example, the MANE packetizes only the selected asset and transmits generated MMT packet(s) to the BbC. In order to determine each packet, the MANE may be required to analyze asset_type within the MPU header. MMT packets corresponding to the asset which is not selected are dropped.

Figure 8A:
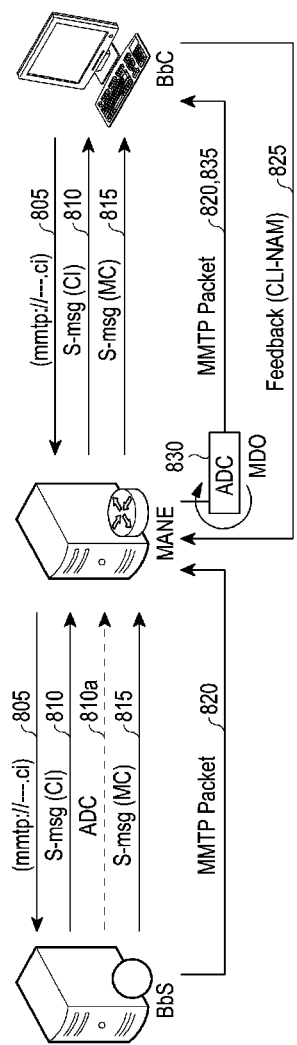
FIGS. 8A and 8B illustrate a media transport controlling operation and a signal flow according to an embodiment of the present disclosure.
Figure 8B:
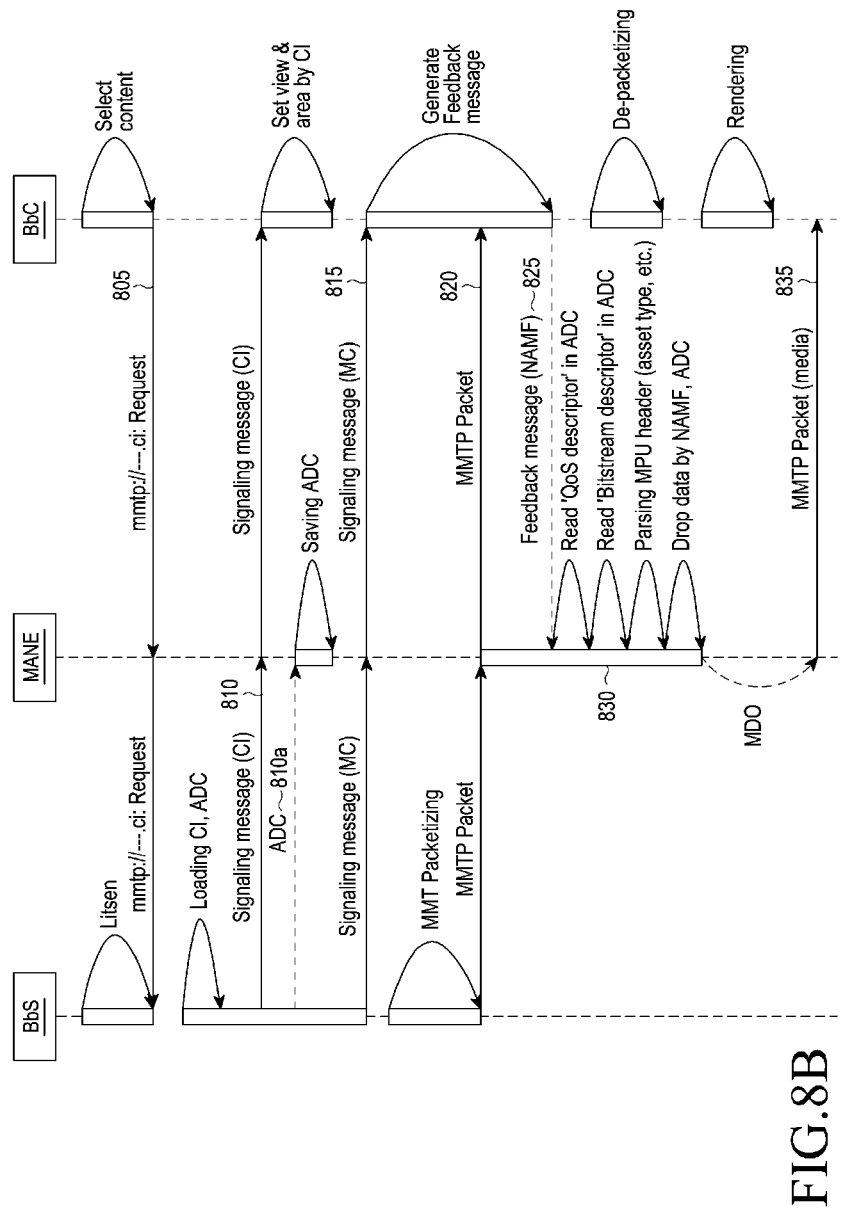

According to an embodiment of the present disclosure illustrated in FIGS. 8A and 8B, the UE having the BbC provides information required for a traffic control to MANE and the MANE controls an amount of traffic of media transport based on the information. The MANE may be implemented by adding an MANE function to the ENB, the P-GW, the S-GW, and the MME illustrated in FIG. 1 and may be used as a dedicated MANE according to a media transport characteristic. Specifically, the MANE selects a single media type of which transmission is to be optimized and controls a frame rate/size of the corresponding media data, so as to control the amount of the transmitted traffic.

FIGS. 8A and 8B illustrate a media transport controlling operation and a signal flow by a network intermediate entity according to an embodiment of the present disclosure.

Referring to FIGS. 8A and 8B, the BbC selects a content to be consumed and transmits a request for the content to the content server having the BbS via the MANE in operation 805. A format of a message for the request may be, for example, "mmtp://~~.ci".

The BbS identifies an MMT package including the requested content, and transmits a CI and an ADC related to the requested content to the MANE in operations 810 and 810a. For example, the ADC may be transmitted using the MMTP or another protocol (e.g., TCP or UDP). Thereafter, the MANE transmits the received CI to the BbC. Further, the MANE stores the received ADC so that the stored ADC can be used for a traffic control in the future.

In operation 815, the BbS may transmit a MC message including a configuration for making a request for feedback of a measurement report to the BbC. When the configuration for the feedback of the measurement report is preset, operation 815 may be omitted.

In operation 820, the BbS packetizes assets including media data related to the content in an order of MPU(s), MFU(s), MMT payload (s), and MMT packet(s) and then transmits the assets to the MANE. The MANE transmits the received MMT packets to the BbC. The MMT packets may be unicasted to the BbC by using the MMTP.

Each of the MPUs includes an MPU header and an MDAT (Metadata) box including media metadata. Further, each of the MPUs may include an MMT hint track indicating a boundary of MFUs, and the MMT hint track includes packet_id which is a unique identifier for the asset to which this hint track is applied, has_mfus_flag which is a flag indicating whether the MPUs are fragmented into MFUs or not, and sequence_number which is an integer number that indicates the sequencing order of this MFU within the MPU.

Each of the MFUs is provided in one segment unit included in the corresponding MPU. Header information of each MMT packet includes at least one of packet_id including a unique identifier of the corresponding asset, packet_sequence_number including an integer value for distinguishing packets having the same packet_id, and timestamp specifying a time instance of the MMP payload.

In operation 825, the BbC transmits a feedback message to the MANE. According to various embodiments of the present disclosure, the BbC may transmit the MMTP NAM message to the MANE according to a predetermined feedback period "t" while the MANE transmits MMT packets. The feedback message may be an NAMF message for CLI feedback among MMT signaling messages provided by the MMTP and include channel data such as a bitrate or a PLR and CLI NAM parameters such as a maximum MPU size.

In operation 830, the MANE controls traffic transport by using the pre-stored ADC based on the feedback message. A detailed operation performed by the MANE is described below.

First, the MANE may identify a bitrate of each asset by analyzing the pre-stored ADC. For example, the ADC includes a QoS descriptor indicating a priority of the corresponding asset and a bitstream descriptor including a bitrate of the corresponding asset. The MANE identifies a bitrate which can be transmitted in a current state of the BbC (e.g., which can be currently received by the BbC) by analyzing NAM information included in the feedback message. Thereafter, the MANE determines whether to transmit the corresponding asset by using priority information within "QoS descriptor" and "bitstream descriptor" of the stored ADC and selects assets to be transmitted. The MANE analyzes a header of each MPU within the selected asset, and determines an MMT packet to be dropped in the unit of MFUs according to an available bitrate and excludes the determined MMT packet from transmission.

In operation 835, the MANE transmits the MMT packets selected from the selected asset to the BbC. For example, the MANE transmits only the MMT packets selected from the selected asset to the BbC.

Thereafter, the BbC de-packetizes the received MMT packets and provides image/audio data based on media data of MFUs extracted from the received MMT packets. For example, the BbC receives only the MMT packets which have not been dropped by the MANE.

MMT parameters used in each entity according to an embodiment of the present disclosure illustrated in FIGS. 8A and 8B are as shown in Table 6. In Table 6 below, a transmission entity refers to the BbS and a reception entity refers to the BbC. Parameters for QoS management are used by the MANE.

TABLE 6

| | Items | Sending entity | Receiving entity | Feedback msg. | QoS management MANE |
|---|---|---|---|---|---|
| Layer E | CI | Just delivery | All elements | N/A | N/A |
| | ADC | Just delivery | N/A | N/A | QoS_descriptor bitstream_descriptor |
| | MPU | MPU header: MPU Metadat, MDAT | MPU header: MPU Metadat, MDAT | N/A | MMT Hint Track: packet_id, has_mfus_flag, sequence_number |
| | MFU | Video segment | Video segment | N/A | N/A |
| Layer D | MMT payload | type: MPUs, signaling messag | type: MPUs, signaling message | signaling message | N/A |
| | MMT packet | packet_id, packet_sequence_number timestamp | packet_id, packet_sequence_number timestamp | N/A | N/A |
| | CLI | N/A | NAM | available_bitrate, BER (8.2) | NAM |
| Layer S | Signaling for E | PA, MCI, MPT, CRI DCI, SSWR | PA, MCI, MPT CRI, DCI, SSWR | N/A | N/A |
| | Signaling for D | MC | NAMF | NAMF (9.4.7) | MC |

Figure 9A:
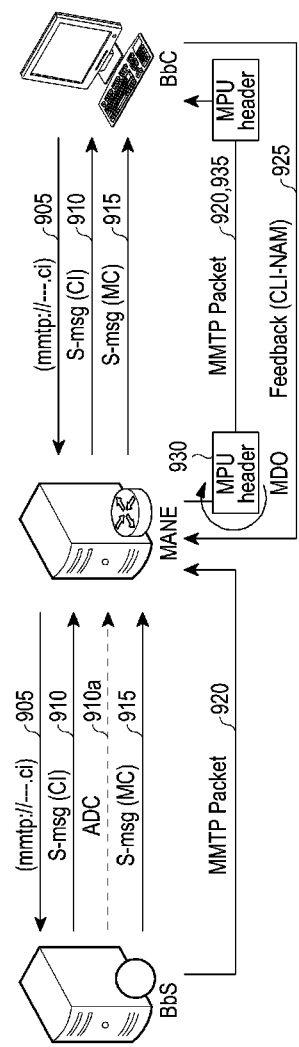
FIGS. 9A and 9B illustrate a media transport controlling operation and a signal flow according to an embodiment of the present disclosure.
Figure 9B:
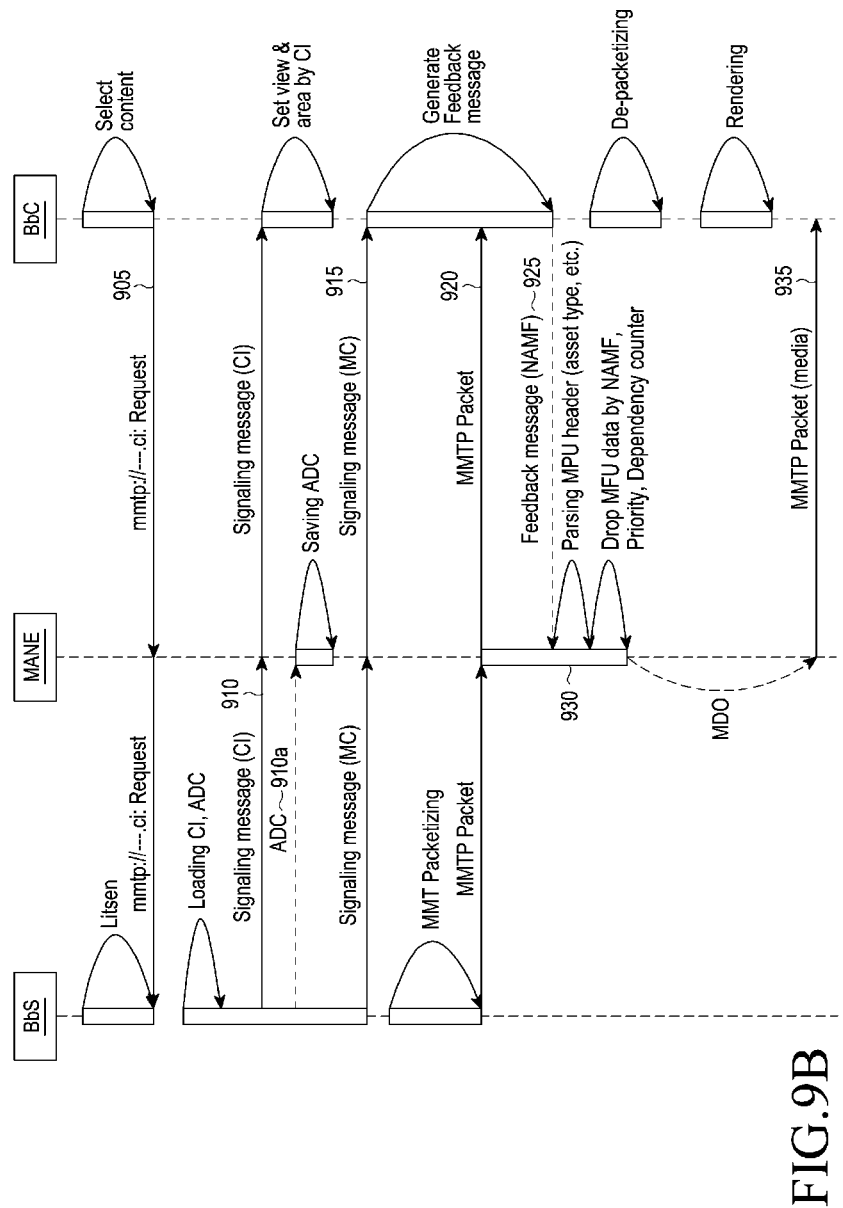

According to an embodiment of the present disclosure illustrated in FIGS. 9A and 9B, the UE having the BbC provides information required for a traffic control to MANE and the MANE controls an amount of traffic of media transport based on the information. The MANE may be implemented by adding an MANE function to the ENB, the P-GW, the S-GW, and the MME illustrated in FIG. 1 and may be used as a dedicated MANE according to a media transport characteristic. Specifically, the MANE controls an amount of transmitted traffic by transport optimization through a priority of a frame of corresponding media data, a correlation of frames and a process of generating transport packets after controlling a reproduction frame speed and a media data size.

FIGS. 9A and 9B illustrate a media transport controlling operation and a signal flow by a network intermediate entity according to an embodiment of the present disclosure.

Referring to FIGS. 9A and 9B, the BbC selects a content to be consumed and transmits a request for the content to the content server having the BbS via the MANE in operation 905. A format of a message for the request may be, for example, "mmtp://~~~.ci".

The BbS identifies an MMT package including the requested content, and transmits a CI and an ADC related to the requested content to the MANE in operations 910 and 910a. For example, the ADC may be transmitted using the MMTP or another protocol (e.g., TCP or UDP). Thereafter, the MANE transmits the received CI to the BbC. Further, the MANE stores the received ADC so that the stored ADC can be used for a traffic control in the future.

In operation 915, the BbS may transmit a MC message including a configuration for making a request for feedback of a measurement report to the BbC. When the configuration for the feedback of the measurement report is preset, operation 915 may be omitted.

In operation 920, the BbS packetizes assets including media data related to the content in an order of MPU(s), MFU(s), MMT payload (s), and MMT packet(s) and then transmits the assets to the MANE. The MANE transmits the received MMT packets to the BbC. The MMT packets may be unicasted to the BbC by using the MMTP.

Each of the MPUs includes an MPU header and an MDAT (Metadata) box including media metadata. Further, each of the MPUs may include an MMT hint track indicating a boundary of MFUs, and the MMT hint track includes at least one of packet_id which is a unique identifier of an asset to which the corresponding hint track is applied, has_mfus_flag which is a flag indicating whether MPUs are split into MFUs, sequence_number which is an integer indicating a sequencing order of the MFUs within the MPU, priority indicating a relative priority of the MFUs against other MFUs, dependency_counter indicating a number of MFUs whose decoding is dependent on the corresponding MFU, offset indicating an offset of media data included in the corresponding MFU, and a length of the data corresponding to the corresponding MFU in bytes.

Each of the MFUs is provided in one segment unit included in the corresponding MPU. Header information of each MMT packet includes at least one of packet_id including a unique identifier of the corresponding asset, packet_sequence_number including an integer value for distinguishing packets having the same packet_id, timestamp specifying a time instance of the MMP payload, QoS_classifier_flag, and transmission_priority.

In operation 925, the BbC transmits a feedback message to the MANE. According to an embodiment of the present disclosure, the BbC may transmit the MMTP NAM message to the MANE according to a predetermined feedback period "t" while the MANE transmits MMT packets. The feedback message may be an NAMF message for CLI feedback among MMT signaling messages provided by the MMTP and include channel data such as a bitrate or a PLR and CLI NAM parameters such as a maximum MPU size.

In operation 930, the MANE controls traffic transport in the unit of MPUs (MPU level) by using the pre-stored ADC based on the feedback message. A detailed operation performed by the MANE is described below.

First, the MANE analyzes NAM information of the feedback message to determine a current channel status of the BbC (e.g., an available bitrate or a PER). Next, the MANE analyzes an MPU header of each MPU to be transmitted to read priority information and selects MFUs to be dropped by using the priority information of the MPU header and dependency_counter in accordance with the available bitrate. Because the priority of the MPU header is a unit of the MFU, the dropping of the MFUs is performed in the unit of MFUs.

In operation 935, the MANE packetizes the remaining selected MFUs except for the dropped MFUs and transmits the MFUs to the BbC.

Thereafter, the BbC de-packetizes the received MMT packets and provides image/audio data based on MMTs extracted from the received MMT packets. For example, the BbC de-packetizes only the received MMT packets and provides image/audio data based on only MMTs extracted from the received MMT packets. For example, the BbC receives a content (MFU drop) of which some MFU data has been lost within a specific MPU.

MMT parameters used in each entity according to an embodiment of the present disclosure illustrated in FIGS. 9A and 9B are as shown in Table 7. In Table 7 below, a transmission entity refers to the BbS and a reception entity refers to the BbC. Parameters for QoS management are used by the MANE.

TABLE 7

|  | Items | Sending entity | Receiving entity | QoS management Feedback msg. | MANE |
|---|---|---|---|---|---|
| Layer E | CI | Just delivery | All elements | N/A | N/A |
|  | ADC | QoS_descriptor bitstream_descriptor | N/A | N/A | N/A |
|  | MPU | MPU header, MPU Metadat, MDAT, | MPU Metadat, MDAT | N/A | MMT Hint Track: packet_id, has_mfus_flag, sequence_number, priority, dependency_counter, offset, length |
|  | MFU | Video segment | Video segment | N/A | N/A |

TABLE 7-continued

| | Items | Sending entity | Receiving entity | Feedback msg. | MANE |
|---|---|---|---|---|---|
| | | | | \multicolumn{2}{QoS management} | |
| Layer D | MMT payload | type: MPUs, signaling message | type: MPUs, signaling message | signaling message | N/A |
| | MMT packet | Just delivery | packet_id, packet_sequence_number timestamp | N/A | packet_id, packet_sequence_number timestamp, QoS_classifier_flag, transmission_priority |
| | CLI | N/A | NAM | available_bitrate, BER (8.2) | NAM |
| Layer S | Signaling for E | PA, MCI, MPT, CRI, DCI, SSWR | PA, MCI, MPT, CRI, DCI, SSWR | N/A | N/A |
| | Signaling for D | MC | NAMF | NAMF (9.4.7) | MC |

Figure 10A:
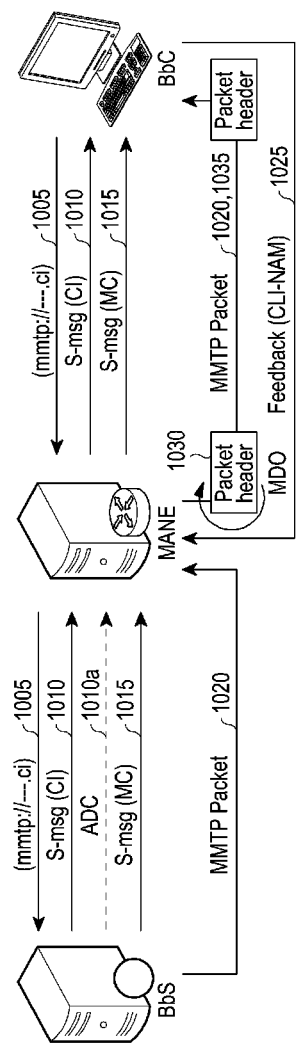
FIGS. 10A and 10B illustrate a media transport controlling operation and a signal flow according to an embodiment of the present disclosure.
Figure 10B:
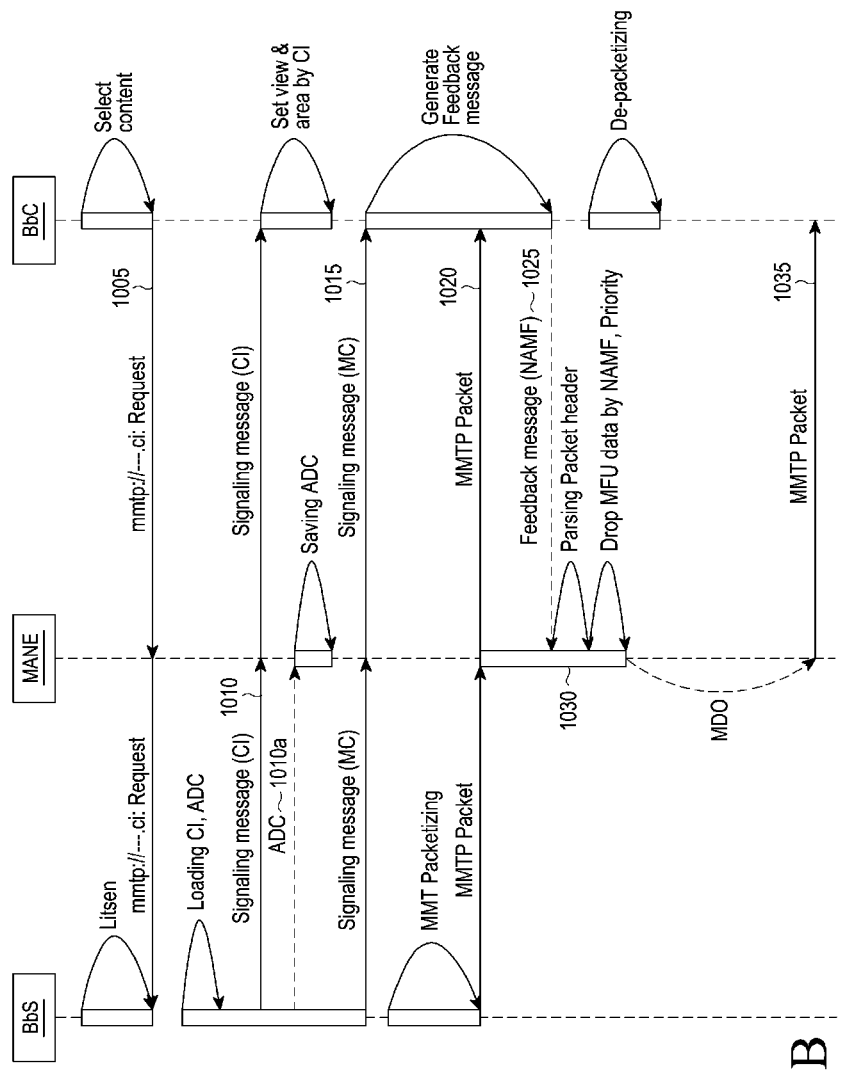

According to an embodiment of the present disclosure illustrated in FIGS. 10A and 10B, the UE having the BbC provides information required for a traffic control to MANE and the MANE controls an amount of traffic of media transport based on the information. The MANE may be implemented by adding an MANE function to the ENB, the P-GW, the S-GW, and the MME illustrated in FIG. 1 and may be used as a dedicated MANE according to a media transport characteristic. Specifically, the transport optimization may control an amount of traffic of the corresponding transmission media packet by determining a priority according to an importance of generated transport packets and determining a transmission order and whether to perform the transmission.

FIGS. 10A and 10B illustrate a media transport controlling operation and a signal flow by a network intermediate entity according to an embodiment of the present disclosure.

Referring to FIGS. 10A and 10B, the BbC selects a content to be consumed and transmits a request for the content to the content server having the BbS via the MANE in operation 1005. A format of a message for the request may be, for example, "mmtp://~~~.ci".

The BbS identifies an MMT package including the requested content, and transmits a CI and an ADC related to the requested content to the MANE in operations 1010 and 1010a. For example, the ADC may be transmitted using the MMTP or another protocol (e.g., TCP or UDP). Thereafter, the MANE transmits the received CI to the BbC. Further, the MANE stores the received ADC so that the stored ADC can be used for a traffic control in the future.

In operation 1015, the BbS may transmit a MC message including a configuration for making a request for feedback of a measurement report to the BbC via the MANE. When the configuration for the feedback of the measurement report is predetermined, operation 1015 may be omitted.

In operation 1020, the BbS packetizes assets including media data related to the content in an order of MPU(s), MFU(s), MMT payload(s), and MMT packet(s) and then transmits the assets to the MANE. The MANE transmits the received MMT packets to the BbC. The MMT packets may be unicasted to the BbC by using the MMTP.

Each of the MPUs includes an MPU header and an MDAT (Metadata) box including media metadata. Further, each of the MPUs may include an MMT hint track indicating a boundary of MFUs, and includes at least one of packet_id which is a unique identifier of an asset to which the corresponding hint track is applied, priority indicating a relative priority of an MFU against other MFUs within one MPU, and dependency_counter indicating a number of MFUs whose decoding is dependent on the corresponding MFU.

Each of the MFUs is provided in one segment unit included in the corresponding MPU. Header information of each MMT packet includes at least one of packet_id including a unique identifier of the corresponding asset, packet_sequence_number including an integer value for distinguishing packets having the same packet_id, timestamp specifying a time instance of the MMP payload, QoS_classifier_flag, and transmission_priority.

In operation 1025, the BbC transmits a feedback message to the MANE. According to various embodiments of the present disclosure, the BbC may transmit the MMTP NAM message to the MANE according to a predetermined feedback period "t" while the MANE transmits MMT packets. The feedback message may be an NAMF message for CLI feedback among MMT signaling messages provided by the MMTP and include channel data such as a bitrate or a PLR and CLI NAM parameters such as a maximum MPU size.

In operation 1030, the MANE controls traffic transport in the unit of MMT packets (MMT packet level) by using the pre-stored ADC based on the feedback message. A detailed operation performed by the MANE is described below.

First, the MANE analyzes NAM information of the feedback message to determine a current channel status of the BbC (e.g., an available bitrate or a PER). Next, the MANE analyzes the packet header of each MMT packet to be transmitted to read priority information and determines packets to be dropped in an order of a packet having a lower priority by using the priority information of the packet header in accordance with an available bitrate. Because the priority of the packet header is a unit of the MFU, the dropping of the packets is performed in the unit of packets. At this time, the MANE is not required to analyze the MPU level and analyzes the corresponding packet header before transmitting each MMT packet to select whether to transmit the packet. For example, the MANE may be required to analyze only the corresponding packet header before transmitting each MMT packet to select whether to transmit the packet.

In operation 1035, the MANE transmits the remaining selected MMT packets except for the dropped MMT packet to the BbC. For example, the MANE transmits only the remaining selected MMT packets except for the dropped MMT packet to the BbC.

Thereafter, the BbC de-packetizes the received MMT packets and provides image/audio data. For example, the BbC de-packetizes only the received MMT packets and provides image/audio data. For example, the BbC receives a content (MFU drop) of which MMT packets corresponding to some MFU data have been lost within a specific MPU.

MMT parameters used in each entity according to an embodiment of the present disclosure illustrated in FIGS. 10A and 10B are as shown in Table 8. In Table 8 below, a transmission entity refers to the BbS and a reception entity refers to the BbC.

Figure 11A:
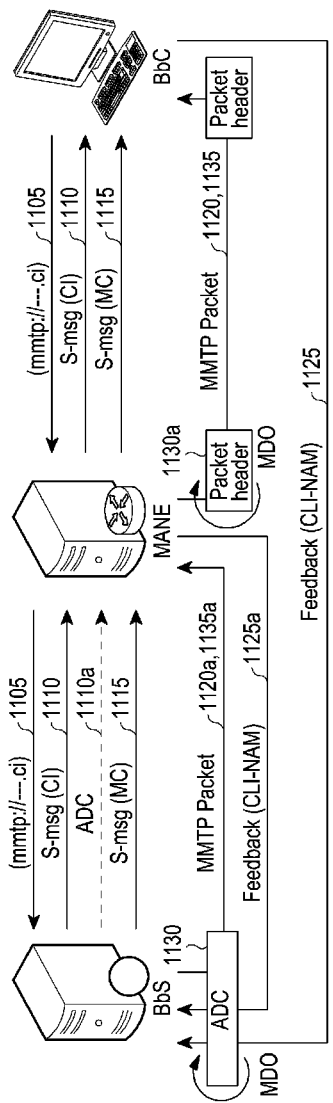
FIGS. 11A and 11B illustrate a media transport controlling operation and a signal flow according to an embodiment of the present disclosure.
Figure 11B:
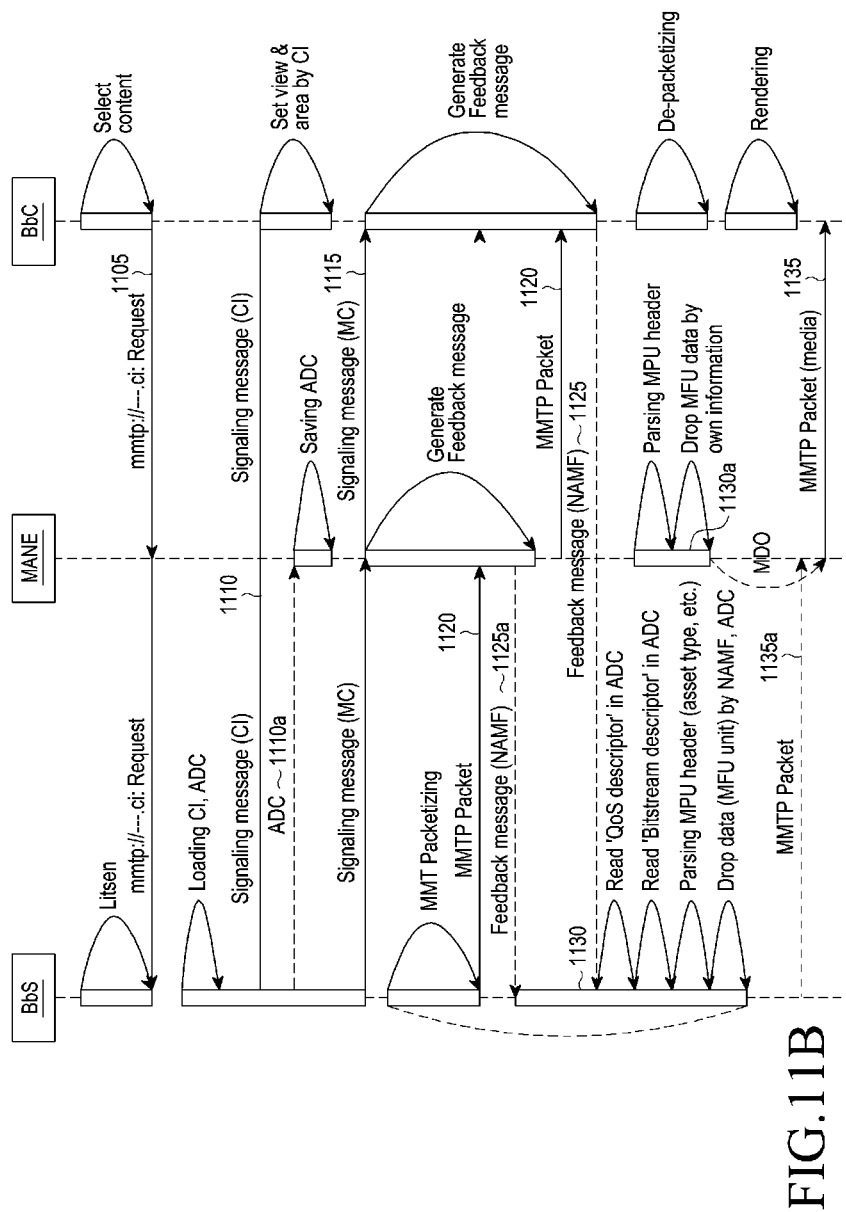

FIGS. 11A and 11B illustrate a media transport controlling operation and a signal flow by a network intermediate entity according to an embodiment of the present disclosure.

Referring to FIGS. 11A and 11B, the BbC selects a content to be consumed and transmits a request for the content to the content server having the BbS via the MANE in operation 1105. A format of a message for the request may be, for example, "mmtp://~~~.ci".

The BbS identifies an MMT package including the requested content, and transmits a CI and an ADC related to the requested content to the MANE in operations 1110 and 1110a. For example, the ADC may be transmitted using the MMTP or another protocol (e.g., TCP or UDP). Thereafter, the MANE transmits the received CI to the BbC. Further, the MANE stores the received ADC so that the stored ADC can be used for a traffic control in the future.

TABLE 8

|  | Items | Sending entity | Receiving entity | QoS management | |
|---|---|---|---|---|---|
|  |  |  |  | Feedback msg. | MANE |
| Layer E | CI | Just delivery | All elements | N/A | N/A |
|  | ADC | QoS_descriptor bitstream_descriptor | N/A | N/A | N/A |
|  | MPU | MPU header: MPU Metadat, MDAT, MMT Hint Track: packet_id, priority, dependency_counter | MPU Metadat, MDAT | N/A | N/A |
|  | MFU | Video segment | Video segment | N/A | N/A |
| Layer D | MMT payload | type: MPUs, signaling message | type: MPUs, signaling message | signaling message | N/A |
|  | MMT packet | Just delivery | packet_id, packet_sequence_number timestamp, | N/A | packet_id, packet_sequence_number timestamp QoS_classifier_flag, transmission_priority |
|  | CLI | N/A | NAM | available_bitrate, BER (8.2) | NAM |
| Layer S | Signaling for E | PA, MCI, MPT, CRI, DCI, SSWR | PA, MCI, MPT, CRI, DCI, SSWR | N/A | N/A |
|  | Signaling for D | MC | NAMF | NAMF (9.4.7) | MC |

According to an embodiment of the present disclosure illustrated in FIGS. 11A and 11B, the UE having the BbC and the MANE provide information required for a traffic control for each link to the content server and the content server and the MANE controls an amount of traffic of media transport based on received or given information. The MANE may be implemented by adding an MANE function to the ENB, the P-GW, the S-GW, and the MME illustrated in FIG. 1 and may be used as a dedicated MANE according to a media transport characteristic. The content server and the MANE controls a number of transmitted media streams, selects a single media type of which transmission is optimized, controls a frame rate and a size of the corresponding media data, controls importance of a frame of the corresponding media data, a correlation of frames, and an amount of traffic transmitted through a process of generating transport packets after controlling a reproduction frame speed and a media data size, and determines a priority according to the importance of the generated transport packets to determine a transmission order and whether to transmit the packet, so as to control the amount of the traffic transmitted in each section.

In operation 1115, the BbS may transmit a MC message including a configuration for making a request for feedback of a measurement report to the BbC. When receiving the MC message, the MANE prepares transmission of the feedback message. Further, the MANE transmits the MC message to the BbC.

In operation 1120a, the BbS packetizes assets including media data related to the content in an order of MPU(s), MFU(s), MMT payload (s), and MMT packet(s) and then transmits the assets to the MANE.

In operation 1120, the MANE transmits the received MMT packets to the BbC. The MMT packets may be unicasted to the BbC by using the MMTP.

Each of the MPUs includes an MPU header and an MDAT (Metadata) box including media metadata. Further, each of the MPUs may include an MMT hint track indicating a boundary of MFUs, and includes at least one of packet_id which is a unique identifier of an asset to which the corresponding hint track is applied, priority indicating a relative priority of an MFU against other MFUs within one MPU, and dependency_counter indicating a number of MFUs whose decoding is dependent on the corresponding MFU.

Each of the MFUs is provided in one segment unit included in the corresponding MPU. Header information of each MMT packet includes at least one of packet_id including a unique identifier of the corresponding asset, packet_sequence_number including an integer value for distinguishing packets having the same packet_id, timestamp specifying a time instance of the MMP payload, QoS_classifier_flag, and transmission_priority.

In operation 1125a, the MANE transmits a feedback message to the BbS. According to various embodiments of the present disclosure, the MANE may transmit the MMTP NAM message to the BbS according to a predetermined feedback period "t" while the BbS transmits MMT packets.

In operation 1125, the BbC also transmits the feedback message to the BbS. According to various embodiments of the present disclosure, the BbC may transmit the MMTP NAM message to the BbS according to a predetermined feedback period "t" while the BbS transmits MMT packets. The feedback messages of operations 1125a and 1125 may be an NAMF message for CLI feedback among MMT signaling messages and include channel data such as a bitrate or a PLR and CLI NAM parameters such as a maximum MPU size.

In operation 1130, the BbS analyzes a channel status between the BbS and the MANE and between the BbS and the BbC through the feedback message received from the MANE and the feedback message received from the BbC, for example, the available bitrate and the PER from the MANE and the available bitrate and the PER from the BbC.

i) BbS-BbC PLR>BbS-MANE PLR: when a channel status between the BbS and the BbC is worse than a channel status between the BbS and the MANE, the BbS performs a traffic control based on the ADC according to the status between the BbS and the BbC similar to the description of FIGS. 4A and 4B and then transmits media data of selected MME packets according to the traffic control to the MANE in operation 1135a.

ii) BbS-BbC PLR<BbS-MANE PLR: when the channel status between the BbS and the BbC is better than the channel status between the BbS and the MANE, the BbS does not perform the traffic control and the MANE caches the media data received from the BbS and transmits the media data to the BbC.

In operation 1130a, the MANE periodically analyzes a channel status between the MANE and the BbC according to the feedback message received from the BbC and given additional information. For example, the MANE performs the traffic control by using the information independently from the control by the BbS. The traffic control by the MANE may be made in the unit of packets (packet level) and is similar to the description in FIGS. 10A and 10B. The MANE may receive MMT packets of which specific MFU data has been dropped in the BbS and selectively drop the received MMT packets again in the unit of packets (packet level).

In operation 1135, the MANE transmits the remaining selected MMT packets except for the dropped MMT packet to the BbC. For example, the MANE transmits only the remaining selected MMT packets except for the dropped MMT packet to the BbC.

Thereafter, the BbC de-packetizes the received MMT packets and provides image/audio data. For example, the BbC de-packetizes only the received MMT packets and provides image/audio data. For example, the BbC receives a content (MFU drop) of which MMT packets corresponding to some MFU data have been lost within a specific MPU.

MMT parameters used in each entity according to an embodiment of the present disclosure illustrated in FIGS. 11A and 11B are as shown in Table 9. In Table 9 below, a transmission entity refers to the BbS and a reception entity refers to the BbC. Parameters for QoS management are used by the BbS and the MANE.

TABLE 9

| | Items | Sending entity | Receiving entity | QoS management Feedback msg. | MANE |
|---|---|---|---|---|---|
| Layer E | CI | Just delivery | All elements | N/A | N/A |
| | ADC | QoS_descriptor bitstream_descriptor | N/A | N/A | N/A |
| | MPU | MPU header: MPU Metadat, MDAT, MMT Hint Track: packet_id, priority, dependency_counter | MPU Metadat, MDAT | N/A | MMT Hint Track: packet_id, priority, dependency_counter, |
| | MFU | Video segment | Video segment | N/A | N/A |
| Layer D | MMT payload | type: MPUs, signaling message | type: MPUs, signaling message | signaling message | N/A |
| | MMT packet | packet_id, packet_sequence_number timestamp, QoS_classifier_flag, transmission_priority | packet_id, packet_sequence_number timestamp | N/A | packet_id, packet_sequence_number timestamp, QoS_classifier_flag, transmission_priority |
| | CLI | NAM | NAM | available_bitrate, BER (8.2) | NAM |
| Layer S | Signaling for E | PA, MCI, MPT, CRI, DCI, SSWR | PA, MCI, MPT, CRI, DCI, SSWR | N/A | N/A |
| | Signaling for D | MC | NAMF | NAMF (9.4.7) | MC |

Figure 12:
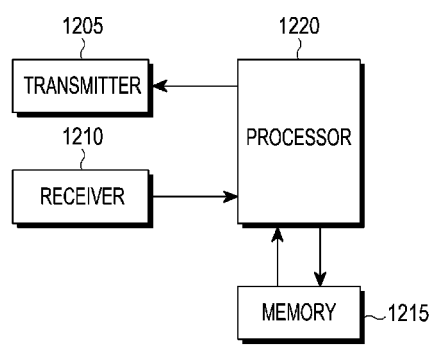
FIG. 12 illustrates a configuration of an apparatus performing a traffic control according to an embodiment of the present disclosure.

FIG. 12 illustrates a configuration of an apparatus performing a traffic control according to an embodiment of the present disclosure.

Referring to FIG. 12, the illustrated configuration may be applied to the UE, the content server, the MANE, and/or the like.

An apparatus of the user UE operating according to various embodiments of the present disclosure will be described with reference to FIG. 12. The apparatus may include a transmitter 1205 and a receiver 1210 that transmit and receive a signal to and from a network. The apparatus may include a processor 1220 that collects information related to the traffic control from the network and that may control the transmitter 1205 and the receiver 1210 to transmit the collected information to a content server, a MANE, and/or the like. The apparatus may further include a memory 1215 that stores a program code according to various embodiments of the present disclosure and information that may be required for an operation of the processor 1220.

An apparatus of the content server operating according to various embodiments of the present disclosure will be described with reference to FIG. 12. The apparatus may include the transmitter 1205 and the receiver 1210 that transmit and receive a signal to and from the UE through at least one network entity. The apparatus may include the processor 1220 that receives information related to the traffic control from the UE, that may determine transmission parameters to be used for data transmission to the UE, and that may control the transmitter 1205 to transmit media data according to the determination. The apparatus may further include a memory 1215 that stores a program code according to various embodiments of the present disclosure and information that may be required for an operation of the processor 1220.

An apparatus of the MANE operating according to various embodiments of the present disclosure will be described with reference to FIG. 12. The apparatus may include the transmitter 1205 and the receiver 1210 that transmit and receive a signal to and from the content server and the UE through at least one network entity. The apparatus may include the processor 1220 that receives information related to the traffic control from the UE, that may determine transmission parameters to be used for data transmission to the UE based on the received and collected information, and that may control the transmitter 1205 to transmit media data according to the determination. The apparatus may further include a memory 1215 stores a program code according to various embodiments of the present disclosure and information that may be required for an operation of the processor 1220.

According to various embodiments of the present disclosure, the server providing a content based on control information of a network or a network device transmitting and processing a content controls transport media for the UE receiving the content in consideration of a media transport characteristic, so that the QoS which a user experiences can be improved.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

Those skilled in the art can appreciate that implementing various embodiments of the present disclosure in another specific form without changing the technical idea or the indispensable characteristics of the present disclosure. Therefore, it should be understood that the above-described embodiments of the present disclosure are illustrative and are not limiting under any possible interpretation. The scope of the present disclosure is defined by the appended claims to be described later, rather than the detailed description. Accordingly, it should be appreciated that all modifications or variations derived from the meaning and scope of the appended claims and their equivalents fall within the scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling media delivery in a multimedia transport network, the method comprising:
transmitting composition information (CI) on media assets within a media package to be transmitted, to a receiving entity, wherein each of the media assets comprises at least one media processing unit (MPU) being independently decodable and fragmented into a plurality of media fragment units (MFUs);
receiving a feedback message including information on a network condition of the receiving entity;
identifying data units from the media package based on the network condition, priority information indicating a relative priority of an MFU against other MFUs within one MPU and a dependency counter indicating a number of other MFUs which should be decoded dependently on a specific MFU; and
packetizing the data units to packets for transmitting.

2. The method of claim 1, wherein the identifying of the data units comprises:
reading a quality of service (QoS) descriptor indicating a priority of a corresponding media asset and a bitstream descriptor indicating a bitrate of the media asset from each asset delivery characteristic (ADC) of the media assets within the media package;

identifying one or more assets, which can be transmitted according to the network condition, from the media package by using the information read from the ADC; and determining to packetize media data of the identified one or more assets.

3. The method of claim 1, wherein the identifying of the data units comprises:

identifying the media data units to be transmitted according to the network condition from the media package by using the CI on the media assets within the media package and asset delivery characteristics (ADC) of the media assets within the media package.

4. The method of claim 3, wherein the identifying of the data units comprises:

reading a dependent asset identifier included in the CI;
determining a type of an asset to be transmitted;
reading a bitstream descriptor indicating a bitrate of a corresponding media asset from each of the ADCs;
identifying one or more assets, which can be transmitted according to the network condition, based on the type of the asset and the bitrate; and
determining to packetize media data of the identified asset.

5. The method of claim 1, wherein the identifying of the data units comprises:

acquiring the priority information and the dependency counter from a header of each MPU included in the media package;
identifying one or more MFUs to be dropped, from MFUs of the MPU according to the network condition by using the priority information and the dependency counter; and
determining to packetize remaining MFUs except for the one or more dropped MFUs.

6. The method of claim 1, further comprising:

determining a header of each packet to be transmitted;
reading priority information indicating relative priorities of one or more MFUs included in the packet from the header of the packet;
determining one or more packets to be dropped according to the network condition by using the priority information; and
determining to transmit remaining packets except for the one or more dropped packets.

7. The method of claim 1, wherein the identifying of the data units is performed by a content server that provides the media package.

8. The method of claim 1, wherein the identifying of the data units is performed by a network intermediate entity that receives the packets from a content server providing the media package and transmits the packets to the receiving entity.

9. The method of claim 1, further comprising:

determining congestion status information; and
transmitting congestion status information to the receiving entity.

10. The method of claim 9, wherein the congestion status information is determined according to at least one of subscription information of the receiving entity, or traffic characteristics related to the receiving entity.

11. A non-transitory computer-readable storage medium storing instructions that, when executed, cause at least one processor to perform the method of claim 1.

12. An apparatus for controlling media delivery in a multimedia transport network, the apparatus comprising:

a transceiver configured to:
transmit composition information (CI) on media assets within a media package to be transmitted, to a receiving entity, wherein each of the media assets comprises at least one media processing unit (MPU) being independently decodable and fragmented into a plurality of media fragment units (MFUs), and
receive a feedback message including information on a network condition of the receiving entity; and a processor configured to:
identify data units from the media package based on the network condition, priority information indicating a relative priority of an MFU against other MFUs within one MPU and a dependency counter indicating a number of other MFUs which should be decoded dependently on a specific MFU, and
packetize the data units to packets for transmitting.

13. The apparatus of claim 12, wherein the processor is further configured to:

acquire the priority information and the dependency counter from a header of each MPU included in the data package,
identify one or more MFUs to be dropped, from MFUs of the MPU according to the network condition by using the priority information and the dependency counter, and
packetize remaining MFUs except for the one or more dropped MFUs.

* * * * *